United States Patent [19]
Pratley et al.

[11] Patent Number: 6,112,216
[45] Date of Patent: Aug. 29, 2000

[54] METHOD AND SYSTEM FOR EDITING A TABLE IN A DOCUMENT

[75] Inventors: Christopher Hugh Pratley; Katsuhiro Namba, both of Seattle, Wash.

[73] Assignee: Microsoft Corporation, Redmond, Wash.

[21] Appl. No.: 08/994,260

[22] Filed: Dec. 19, 1997

[51] Int. Cl.$^7$ .................................................. G06F 1/035
[52] U.S. Cl. ......................................... 707/509; 707/510
[58] Field of Search .................................... 707/503, 504, 707/509, 510

[56] References Cited

U.S. PATENT DOCUMENTS

| | | | |
|---|---|---|---|
| 4,980,841 | 12/1990 | Sugitani | 707/510 |
| 5,671,427 | 9/1997 | Nishimura | 707/509 |
| 5,808,914 | 9/1998 | Shin et al. | 395/500.23 |
| 5,835,916 | 11/1998 | Inaki et al. | 707/509 |
| 5,867,159 | 2/1999 | Hamada et al. | 345/443 |
| 5,956,700 | 9/1999 | Landry | 705/40 |

*Primary Examiner*—Stephen S. Hong
*Assistant Examiner*—Cesar B. Paula
*Attorney, Agent, or Firm*—Jones & Askew LLP

[57] ABSTRACT

A method and system for inserting a table over text, for splitting a cell with text into two or more cells, for converting a bordered paragraph into a table, and for adding cells to a table. A table drawing tool allows a user to insert a table over existing text in a document, convert a bordered paragraph into a table, split a table cell into multiple cells, and add cells to a table, among other features. To insert a table over existing text, a subset of the plurality of lines of text that the table covers is determined. A determination is made whether the subset of text needs to be placed inside the table. If so, then the subset of text is extracted from the electronic file and the subset is placed inside a paragraph. The table is inserted into the electronic file with a height equal to the height of the extracted subset of text and the paragraph is pasted into the table. If it is determined that the subset of text does not need to be placed inside the table, then the table is added to the electronic file as a paragraph, without any text in the paragraph.

6 Claims, 17 Drawing Sheets

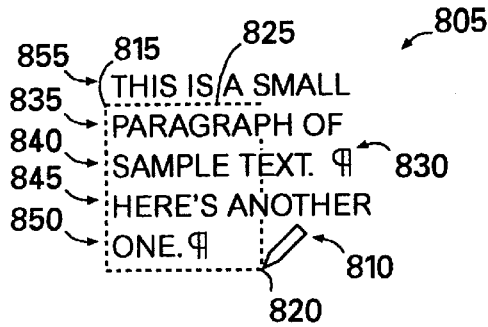
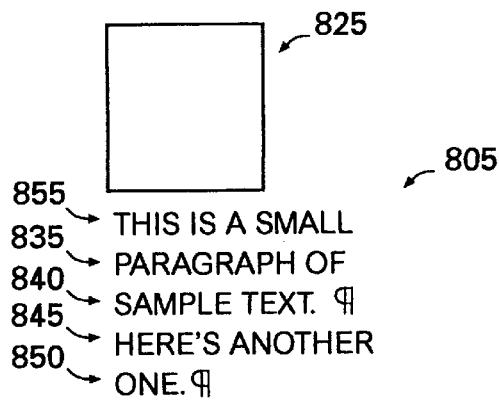
FIG.8A    FIG.8B
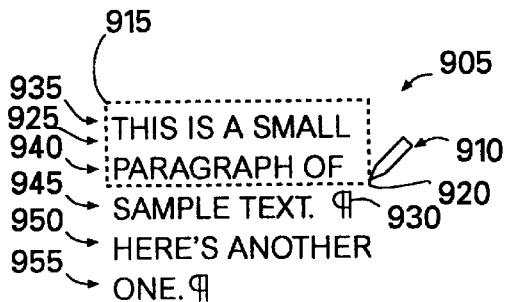
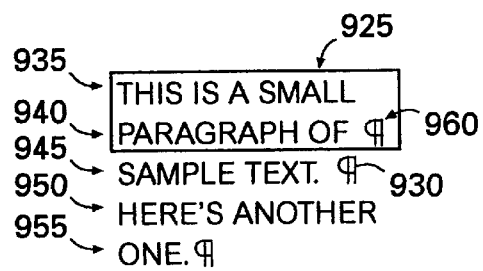
FIG.9A    FIG.9B
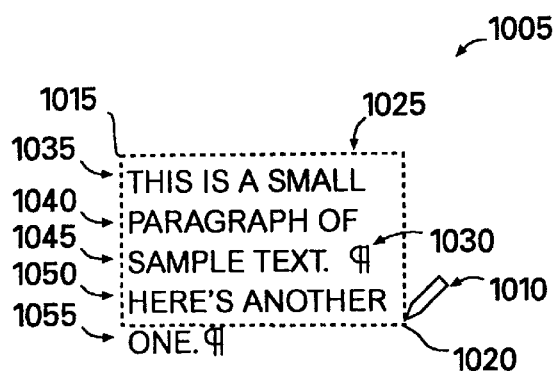
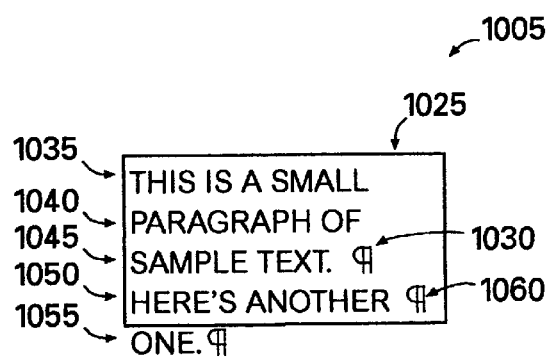
FIG.10A    FIG.10B

METHOD AND SYSTEM FOR EDITING A TABLE IN A DOCUMENT

TECHNICAL FIELD

This invention relates to editing a table in an electronic document. More particularly, this invention relates to inserting a table over text, for converting a bordered paragraph into a table, for splitting table cells with text, and for adding cells to a table.

BACKGROUND OF THE INVENTION

Use of word processing program modules has increased in recent years due in part to the flexibility and simplicity of these programs. Oftentimes, documents with tables are produced using these word processing program modules.

Unfortunately, documents with tables are not as easy to produce as documents of entire text. Thus, word processing program developers have tried to develop easier, simpler, and more user-friendly mechanisms for producing and editing tables in an electronic document in order to provide a more competitive word processing program.

In order to better understand how tables are produced and stored in an electronic document, it is helpful to review how elements of a document, in general, are produced and stored. Some word processing program modules store elements of an electronic document on a character basis. For these character word processing program modules, new table-forming characters may be added as characters to the word processing program module so that tables may be inserted into a document. For example, referring to FIG. 1, several different table-forming characters 10 are illustrated: a horizontal line 15, a vertical line 20, corner characters 25, 30, 35, 40, four-way junction 45, and t-junctions 50, 55. Using these table-forming characters 10, a user may construct a table of virtually any size and shape using either a keyboard or a mouse to add the table-forming characters to a document.

In early versions of program modules with table-forming characters, the addition of textual characters to a table might destroy the shape of the table since any added characters could push or move the table-forming characters and, thus, destroy the shape of the table. In later improvements, program modules were provided with some intelligence to determine whether the characters on a line constitute a table and, if so, to make certain adjustments. For example, the program may make an adjustment to switch to an overtype mode or to wrap text to the next line. Although table-forming characters provide an adequate solution for tables in word processing program modules that store elements on a character basis, some word processing program modules do not store elements of a document on a character basis. Thus, a different solution is needed to provide easy-to-use tables for these program modules.

Some word processing program modules store text as a stream of characters with paragraph marks. The paragraph marks hold formatting information for the stream of characters. Typically, in these stream-based program modules, cells in a table are composed of a series of paragraphs with special table formatting. The special table formatting may describe attributes of the cell such as the type of border of the cell, the row that the cell is in, the height of the row, whether text is displayed at the top, the middle, or the bottom of the cell, justification of text in the cell, and other attributes. Thus, although the table appears on screen as a single object, it may be stored as a series of paragraphs.

Some word processing program modules also include master cells and slave cells for tables. Typically, master cells control the formatting of slave cells. Slave cells are suppressed, i.e., their borders, contents, etc., are controlled by the master cell. Referring now to FIG. 2, a table 200 is illustrated including master cells and slave cells. In FIG. 2, the dashed lines represent lines that define cell borders, but which are not displayed on-screen. It should be understood that a row in a table typically must be the same height across the entire row. Thus, there is a need for master cells and slave cells. Cell 205 appears to the user as one large cell when it is actually composed of four cells: a master cell 210 and slave cells 215. It should also be understood that cell 217 is composed of master cell 220 and slave cells 225. Generally, all slaves cells must be calculated before the complete cells 205, 217 can be drawn because the complete cell boundaries are not known until all the slave cells have been calculated.

In some stream-based word processing program modules, a table drawing tool for drawing tables is available. Generally, a table drawing tool allows a user to insert a one-cell table by clicking down a mouse button at a point in a document. The user holds down the mouse button and drags the mouse to increase or decrease the size of the table. When the user releases the mouse button, the table is inserted into the document at the insertion point. Prior to the availability of a table drawing tool, a table was inserted into a document by selecting an insert table command from a menu.

Although using the prior art table drawing tools are more convenient than selecting an insert table command from a menu, there are problems with these prior art table drawing tools. In the prior art, the situation in which a table is drawn on top of existing text is not handled the way users expect. A user draws a table over text, expecting it to become a table around existing text, but instead the text is pushed up or down in the document and the table is inserted with no text inside. For example, referring now to FIG. 3A, a prior art table drawing tool 300 is illustrated. As shown in FIG. 3A, a table drawing tool 300 is typically displayed on a viewing screen or display as a pen, or stylus. The dashed line in FIG. 3A represents a new table 305 to be inserted into a document 310. The document 310 includes a first sentence 315, a second sentence 320 and a third sentence 325. The new table 305 begins at insertion point 330 when the user clicks a mouse button to insert the new table 305. The new table 305 ends at end point 335 after the user drags the mouse to end point 335 and releases the mouse button. It should be understood that the new table is typically represented by a dashed line until the user releases the mouse button. Thus, as shown in FIG. 3A, the new table 305 has not yet been inserted into the document and the user has not yet released the mouse button.

Still referring to FIG. 3A, it will be seen that new table 305 completely covers the second sentence 320 and the third sentence 325. A user generally expects the second sentence 320 and the third sentence 325 to be inside the new table 305 after the mouse button is released. However, as shown in FIG. 3B, that is not the case with the prior art table drawing tools.

Referring now to FIG. 3B, the new table 305 of document 310 is illustrated. The new table 305 is a solid line in FIG. 3B demonstrating that the mouse button has been released and new table 305 has been inserted into the document 310. New table 305 has been inserted into the document at the insertion point 330, but the second sentence 320 and the third sentence 325 are no longer inside the table 305. Thus, there is a need for inserting a table into a document such that a table may be inserted over existing text with the existing text placed inside the table.

Another problem of the prior art table drawing tools is that when a user attempts to split a table cell with text into two table cells, one cell is typically expanded to include all the text, when the user actually wanted to split the text between the two cells. For example, users might put spaces or tabs to separate text and may believe they could split the text into two cells at the point of the spaces or tabs. This does not work with the prior art table tools because of the stream-based structure of word processing program modules.

Referring now to FIG. 4A, a table drawing tool 405 in a document 410 has been dragged vertically downward from insertion point 415 to an end point 420 to form a cell border 422. As illustrated in FIG. 4A, the cell border 422 has not been placed inside the document 410 yet, as indicated by the dashed line. First sentence 425, second sentence 430 and third sentence 435 are inside an existing table 440. Generally, when the user releases the mouse button to insert the cell border 422 into the document, the user expects that the sentences 425, 430 and 435 will be split at the cell border 422. As illustrated in FIG. 4B, this is not the result with the prior art table drawing tool.

Referring now to FIG. 4B, the table 440 of document 410 has been split into two cells 445, 450. However, the cell 445 has been expanded vertically to accommodate the sentences 425, 430, and 435. No text is displayed in a cell 450. This is a result that the user typically does not expect. Thus, there is a need for splitting a cell in a table such that the text inside the cell is split between the two cells.

Another problem with prior art table drawing tools is the inability to add cells to the sides, top, or bottom of a table. Thus, there is a need for adding cells to the sides, top, or bottom of a table.

In summary, there is a need in the art for a method and system for inserting a table into a document such that a table may be inserted over existing text with the existing text placed inside the table. There is a further need in the art for a method and system for splitting a cell in a table such that the text inside the table is split between the two resulting cells. There is still a further need for a method and system for adding cells to the sides, top, or bottom of a table using a table drawing tool.

SUMMARY OF THE INVENTION

Generally described, the present invention provides a computer-implemented method for inserting a table over text, for splitting a cell with text into two or more cells, for converting a bordered paragraph into a table, and for adding cells to a table.

In one aspect, the present invention is a computer-implemented method for inserting a table over existing text. A subset of the plurality of lines of text that the table covers is determined. A determination is made whether the subset of text needs to be placed inside the table. If so, then the subset of text is extracted from the electronic file and the subset is placed inside a paragraph. The table is inserted into the electronic file with a height equal to the height of the extracted subset of text and the paragraph is pasted into the table. If it is determined that the subset of text does not need to be placed inside the table, then the table is added to the electronic file as a paragraph, without any text in the paragraph.

In one aspect, the present invention is a computer-implemented method for converting a bordered paragraph into a first table. A determination is made whether a second table is greater than 20 pixels long in height and, if so, a determination is made whether the second table is less than five pixels in width. If the second table is less than five pixels in width, then an examination is made of the lines of text that are intersected by the second table to determine whether the intersected lines share a paragraph border. If the intersected lines share a paragraph border, then the intersected lines are extracted from the document. The first table is placed into the document and the intersected lines of text are placed inside the first table.

In another aspect, the present invention is a method for adding a cell to the top or bottom of an existing table. A determination is made whether the cell is within 5 pixels of a top or a bottom of the existing table. If so, then a determination is made that the cell is a new cell in the existing table and the new cell is added to the top or the bottom of the existing table.

In yet another aspect, the present invention is a method for adding a cell to the side of an existing table. A determination is made whether the cell is within five pixels of the existing table. If so, then the cell is added as a new cell in the existing table. The top of the new cell is aligned to a first row of the existing table and the bottom of the new cell is aligned to a second row of the existing table.

These and other features, advantages, and aspects of the present invention may be more clearly understood and appreciated from a review of the following detailed description of the disclosed embodiments and by reference to the appended drawings and claims.

BRIEF DESCRIPTION OF THE DRAWINGS

FIGS. 8A, 8B, 9A, 9B, 10A and 10B are illustrations of inserting a table over text.

DETAILED DESCRIPTION

Figure 1:
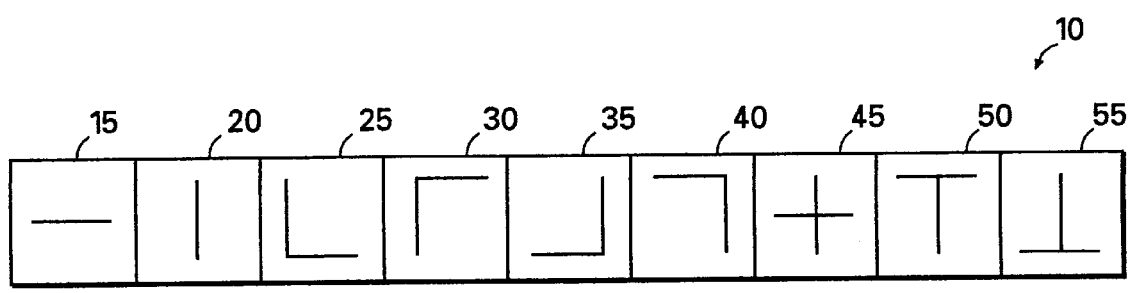
FIG. 1 is an illustration of several different table-forming characters.
Figure 2:
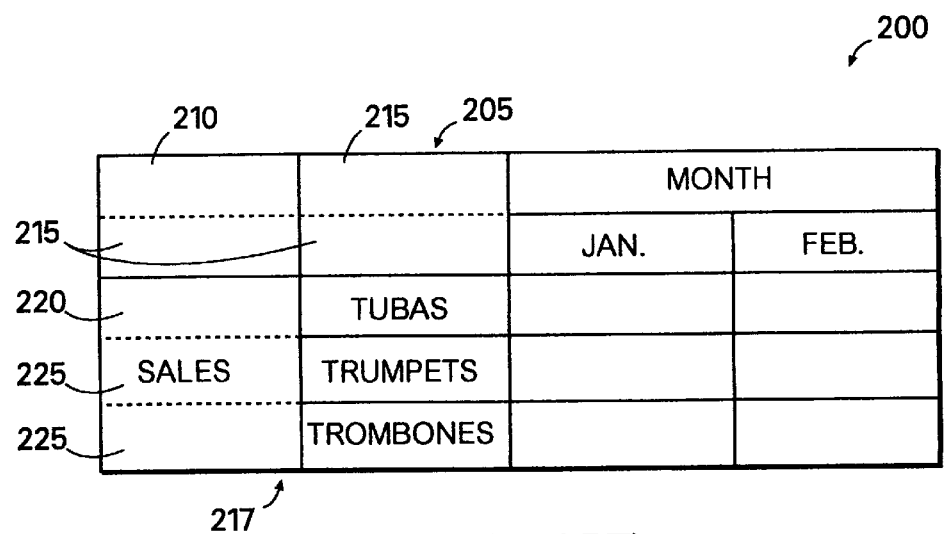
FIG. 2 is an illustration of a table including master cells and slave cells.
Figure 3A:
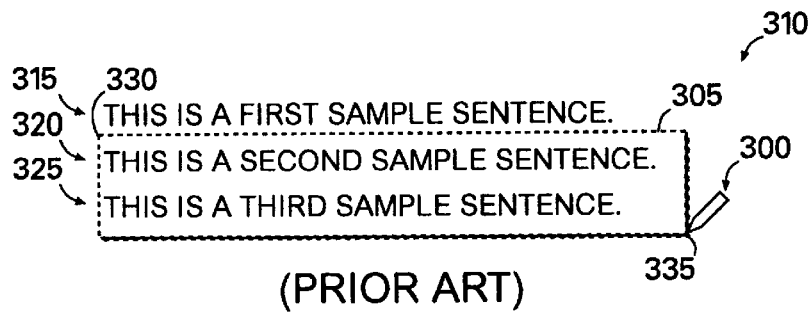
FIGS. 3A–3B are illustrations of inserting a new table into a document using a prior art table drawing tool.
Figure 3B:
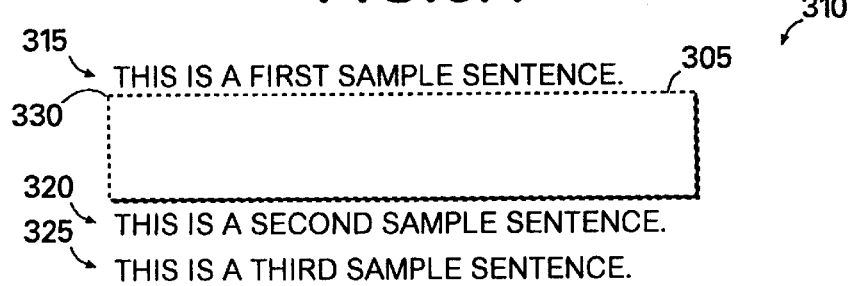
Figure 4A:
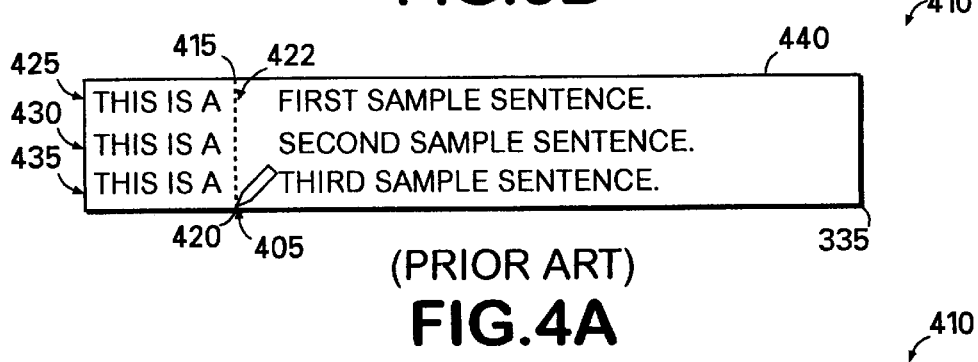
FIGS. 4A–4B are illustrations of splitting an existing table using a prior art table drawing tool.
Figure 4B:
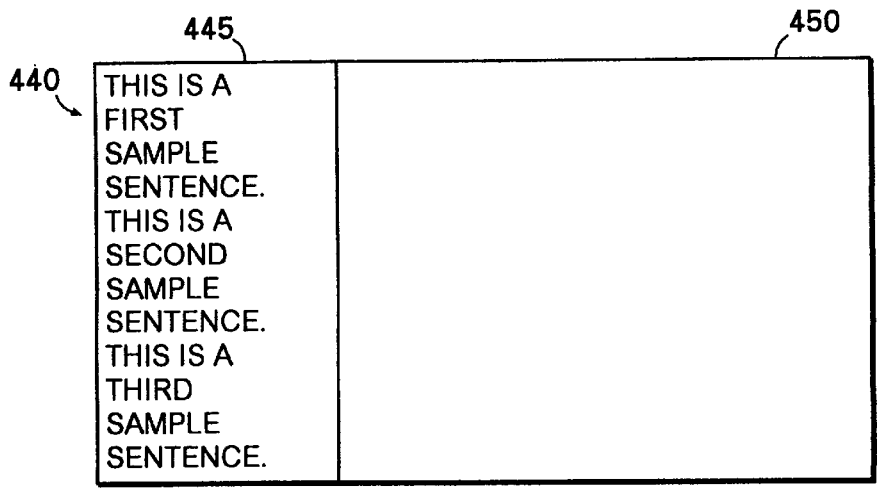

The present invention is directed toward inserting a table over text, for splitting a cell with text into two or more cells, for converting a bordered paragraph into a table, and for adding cells to a table. In one embodiment, the invention is incorporated into a preferred word processing application program entitled "WORD 97 FE (Far East version)", marketed by Microsoft Corporation of Redmond, Washington. Briefly described, the preferred application program allows a user to create and edit electronic documents by entering characters, symbols, graphical objects, and commands. "WORD 97 FE (Far East version)" stores electronic documents as a stream of characters with paragraph marks. The paragraph marks hold formatting information for the stream of characters. Typically, cells in a table are composed of a series of paragraphs with special table formatting. The special table formatting may describe attributes of the cell such as the type of border of the cell, the row that the cell is in, the height of the row, whether text is displayed at the top, the middle, or the bottom of the cell, justification of text in the cell, and other attributes.

The preferred application program also allows a user to create and edit tables using a table drawing tool. Generally described, a table drawing tool in accordance with an embodiment of the present invention is incorporated into the preferred application program module and allows a user to insert a table over text, convert a bordered paragraph into a table, split a table cell into multiple cells, and add cells to a table, among other features.

Having briefly described an exemplary embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

Figure 5:
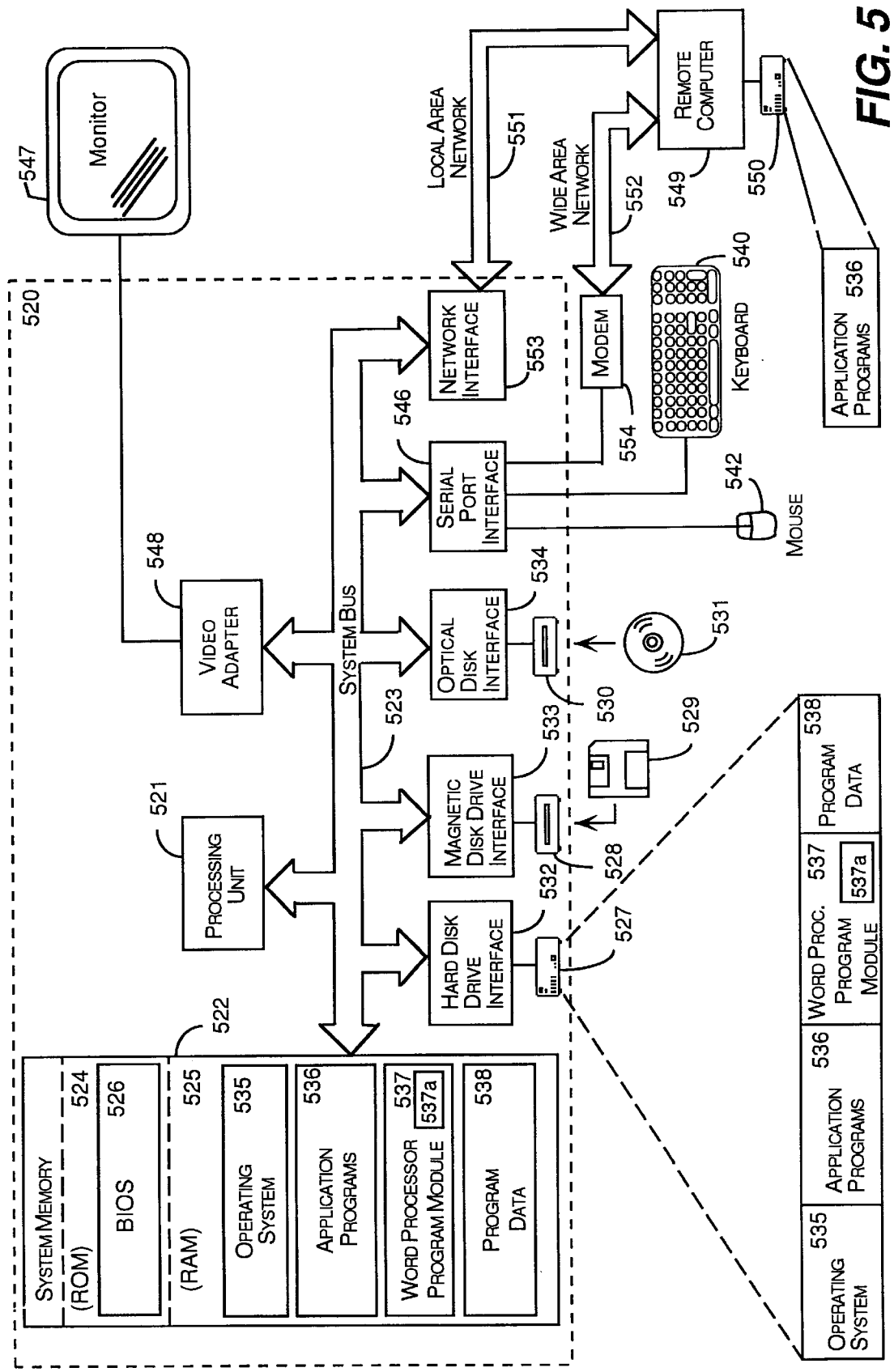
FIG. 5 is a block diagram of a computer that provides the exemplary operating environment for the present invention.

FIG. 5 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 5, an exemplary system for implementing the invention includes a conventional personal computer 520, including a processing unit 521, a system memory 522, and a system bus 523 that couples the system memory to the processing unit 521. The system memory 522 includes read only memory (ROM) 524 and random access memory (RAM) 525. A basic input/output system 526 (BIOS), containing the basic routines that help to transfer information between elements within the personal computer 520, such as during start-up, is stored in ROM 524. The personal computer 520 further includes a hard disk drive 527, a magnetic disk drive 528, e.g., to read from or write to a removable disk 529, and an optical disk drive 530, e.g., for reading a CD-ROM disk 531 or to read from or write to other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide nonvolatile storage for the personal computer 520. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 525, including an operating system 535, one or more application programs 536, a word processor program module 537, program data 538, and other program modules (not shown). The word processor program module 537 may also include a table drawing tool program module 537a for adding tables to an electronic document and editing tables in an electronic document.

A user may enter commands and information into the personal computer 520 through a keyboard 540 and pointing device, such as a mouse 542. Other input devices (not shown) may include a microphone, joystick, game pad, satellite dish, scanner, or the like. These and other input devices are often connected to the processing unit 521 through a serial port interface 546 that is coupled to the system bus, but may be connected by other interfaces, such as a game port or a universal serial bus (USB). A monitor 547 or other type of display device is also connected to the system bus 523 via an interface, such as a video adapter 548. In addition to the monitor, personal computers typically include other peripheral output devices (not shown), such as speakers or printers.

The personal computer 520 may operate in a networked environment using logical connections to one or more remote computers, such as a remote computer 549. The remote computer 549 may be a server, a router, a peer device or other common network node, and typically includes many or all of the elements described relative to the personal computer 520, although only a memory storage device 550 has been illustrated in FIG. 1. The logical connections depicted in FIG. 1 include a local area network (LAN) 551 and a wide area network (WAN) 552. Such networking environments are commonplace in offices, enterprise-wide computer networks, intranets and the Internet.

When used in a LAN networking environment, the personal computer 520 is connected to the LAN 551 through a network interface 553. When used in a WAN networking environment, the personal computer 520 typically includes a modem 554 or other means for establishing communications over the WAN 552, such as the Internet. The modem 554, which may be internal or external, is connected to the system bus 523 via the serial port interface 546. In a networked environment, program modules depicted relative to the personal computer 520, or portions thereof, may be stored in the remote memory storage device. It will be appreciated that the network connections shown are exemplary and other means of establishing a communications link between the computers may be used.

Having described an exemplary operating environment for the present invention, embodiments of the present invention will be described below. Briefly described, the present invention provides a method and system for inserting a table over existing text, for converting a bordered paragraph into a table, for splitting a table cell into multiple cells, and for adding cells to a table.

Method for Inserting a Table Over Existing Text

Figure 6:
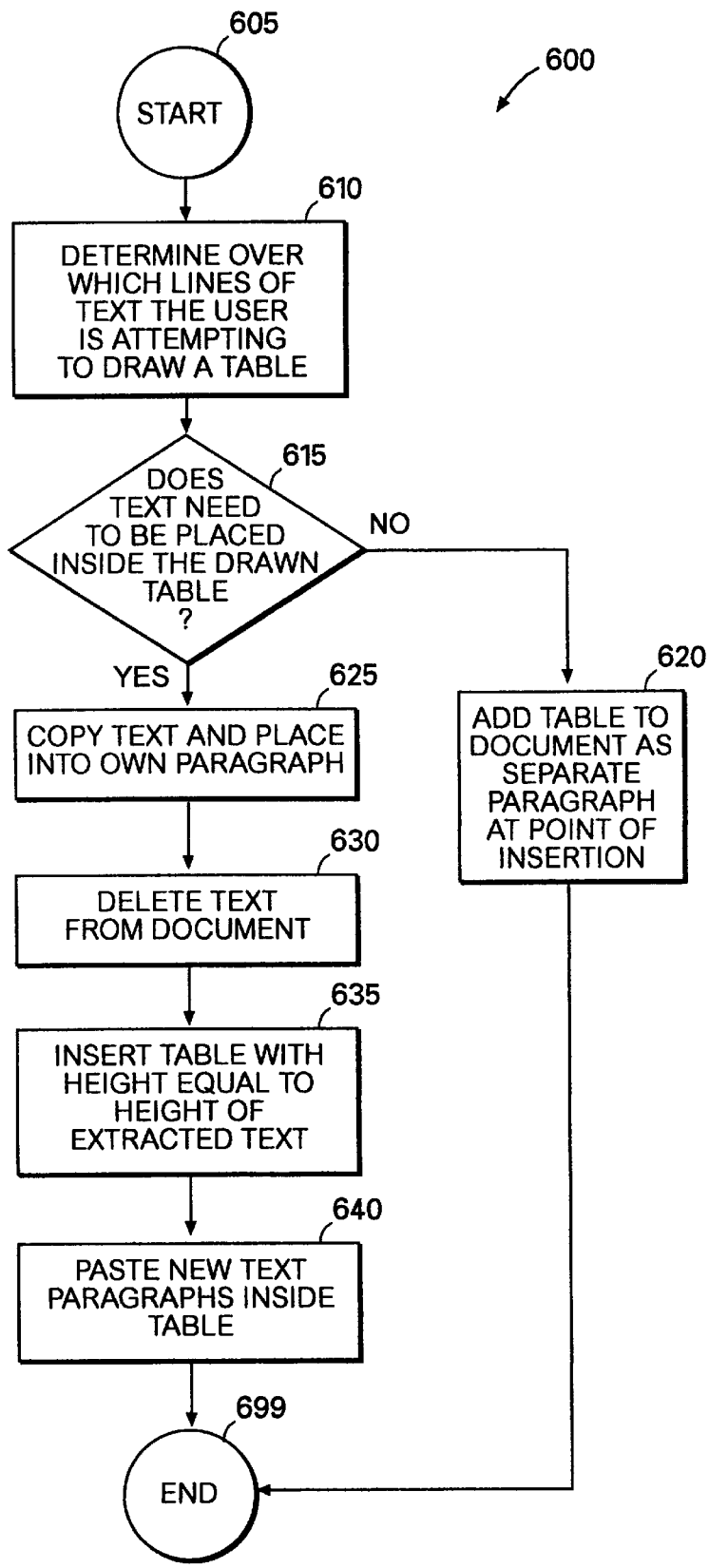
FIG. 6 is a flow chart illustrating a method for inserting a table over existing text.

The table tool program module 537*a* may include the capability of inserting a table over existing text. As described above in the Background, prior art table tools for stream-based program modules were unable to add a table over existing text. FIG. 6 is a flow chart illustrating a method 600 for inserting a table over existing text in accordance with an exemplary embodiment of the present invention. Those skilled in the art will appreciate that this exemplary embodiment is a computer-implemented process that is carried out by the computer in response to input from the user and instructions provided by a program module.

Generally described, this method comprises determining over which text the new table has been drawn and determining whether this text needs to be placed in the table. If so, then this text is extracted and placed into its own new paragraph. The text is deleted from the document and a table is inserted with a height equal to the height of the extracted text. The new text paragraph is then pasted into the table. However, if it is determined that the text which the table has been drawn over does not need to be placed in the table, then the table is added into the document as a paragraph with no text pasted into the table.

Referring now to FIG. 6, the method 600 for inserting a table over existing text begins at start step 605 and proceeds to step 610 when a user, using the table drawing tool, draws a table over existing text in a document. Existing text refers to text that has already been placed in the document, as opposed to text that is typed into a table after the table has been drawn. At step 610, it is determined over which lines of text the user is attempting to draw a table. It should be understood that the electronic document includes information regarding the location of lines of text. Using this information along with information regarding the drawn table, such as the insertion point of the drawn table, the word processing program module 537 is able to determine over which lines of text the user is attempting to draw a table. After it is determined over which lines of text the user is attempting to place a table, the method proceeds to decision step 615.

At decision step 615, it is determined whether the covered lines of text need to be placed inside the drawn table. The covered lines of text refers to the lines of text which the user is trying to draw over. In one embodiment, the determination at decision step 615 is made based upon whether the width of the drawn table covers the width of the covered text. If, at decision step 615, it is determined that the covered lines of text do not need to be placed inside the drawn table, then the method proceeds to step 620.

At step 620, the drawn table is added to the document at the point of insertion as a separate paragraph from the text. The point of insertion refers to the point at which the user begins to draw the table. Thus, the drawn table does not include the covered text. The method then ends at step 699.

However, if, at decision step 615, it is determined that the covered lines of text do need to be placed inside the drawn table, then the method proceeds to step 625. At step 625, the lines of text over which the table is drawn are copied and placed into their own paragraph. The method then proceeds to step 630. The text over which the table is drawn is then deleted from the document at step 630 and the method proceeds to step 635.

At step 635, the drawn table is inserted into the document. It should be understood that the drawn table typically has a height equal to the height of the text that was extracted from the document at step 625. After the drawn table is inserted into the document at step 635, the method proceeds to step 640.

At step 640, the new text paragraph that was created at step 625 is pasted into the new table. The method then ends at step 699. It should be understood that the steps of method 600 are accomplished in the background such that the user does not see these steps. The user simply sees the end result on the monitor 547.

Figure 7:
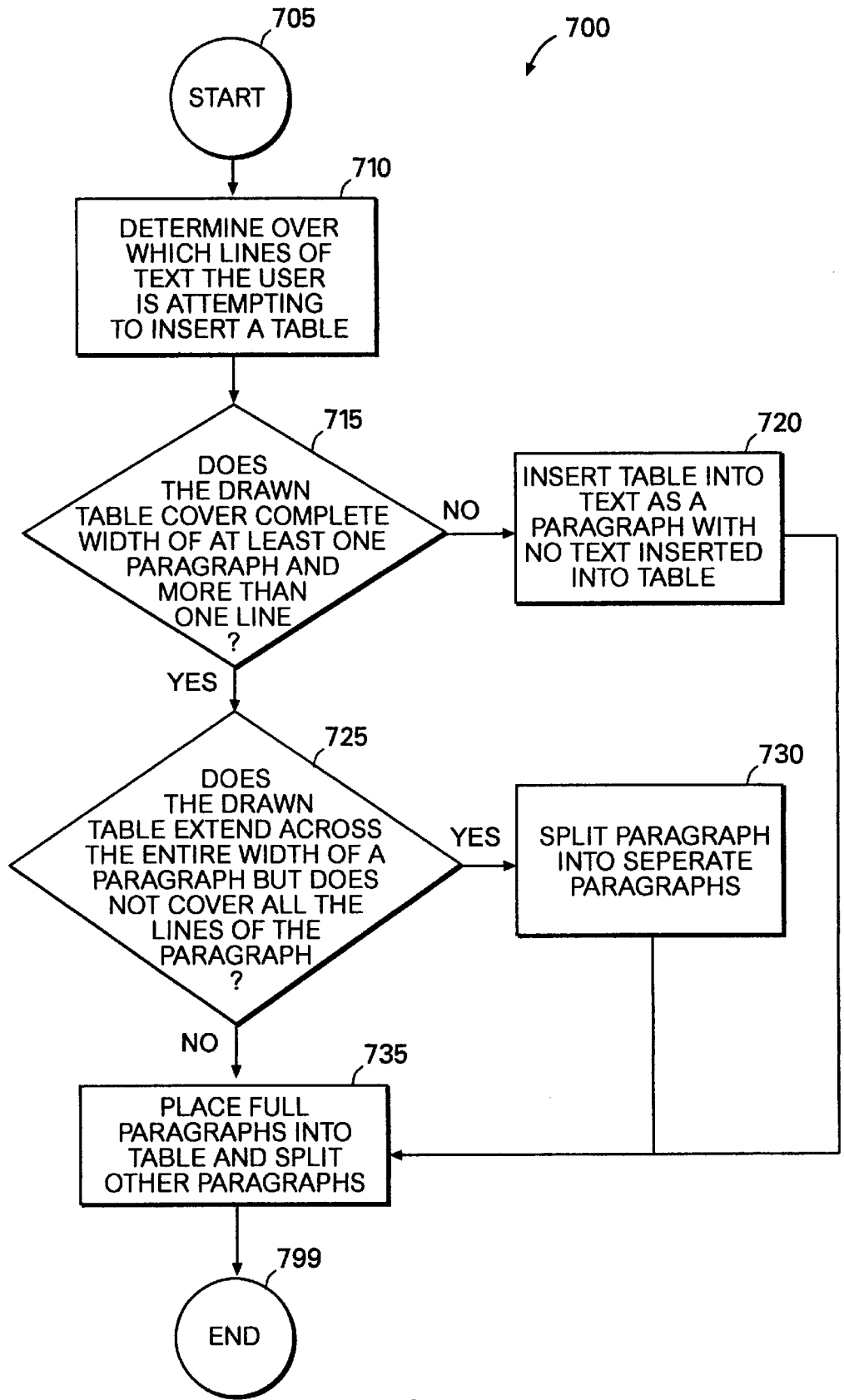
FIG. 7 is a flow chart illustrating another embodiment of a method for inserting a table over existing text.

More specifically, in another embodiment, referring to FIG. 7, the method 700 for inserting a table over existing text begins at start step 705 and proceeds to step 710 when a user draws a table over existing text in a document using the table drawing tool. At step 710, it is determined over which lines of text the user is attempting to insert a table. After it is determined over which lines of text the user is attempting to insert a table, the method proceeds to decision step 715.

At decision step 715, it is determined whether the drawn table covers the complete width of at least one paragraph and more than one line of text. If not, then the method proceeds to step 720. It should be understood that if the drawn table does not cover the complete width of at least one paragraph and more than one line of text, then the user is probably not trying to draw a table over existing text. At step 720, the drawn table is added to the electronic document at the start of the paragraph containing the point of insertion as a separate paragraph from the text and no text is inserted into the table. The method then ends at step 799.

However, if at decision step 715, it is determined that the drawn table covers the entire width of at least one paragraph and more than one line of text, then the method proceeds to decision step 725. At decision step 725, it is determined whether the drawn table extends across the entire width of a single paragraph, but does not cover all the lines of the paragraph. If so, then the method proceeds to step 730. However, if not, then the method proceeds to step 735.

At step 730, the paragraph which includes the covered text is split into separate paragraphs. The covered lines of text are placed into one paragraph and the uncovered lines of text are placed into another paragraph. The paragraph including the covered text is placed into the drawn table and the paragraph including the uncovered text is placed outside the table. The method then ends at step 799.

At step 735, any complete paragraphs are placed into the drawn table and any partial paragraphs are split into separate paragraphs, as described for step 730 such that any covered text is placed into the drawn table. The method then ends at step 799.

To demonstrate method 700, examples are provided in reference to FIGS. 8A, 8B, 9A, 9B, 10A, and 10B. Referring now to FIG. 8A, a document 805 includes text with paragraph marks, such as a paragraph mark 830. A table tool 810 is provided and a new table 825 has been drawn beginning at insertion point 815 and ending at an end point 820. As shown in FIG. 8A, the table 825 is represented by dashed lines to show that it has not been inserted into the document yet because the user has not released the mouse button.

Referring now to method 700, FIG. 7, and FIG. 8A, the method 700 for inserting a table over existing text begins at start step 705 and proceeds to step 710 when a user draws the table 825 over existing text in the document using the table drawing tool 820 and releases the mouse button to insert the table 825 into the document 805. At step 710, it is determined over which lines of text the user is attempting to insert the table 825. Referring to FIG. 8A, it is determined that the user is attempting to insert the table 825 over lines 835, 840, 845, and 850. Line 855 is not covered by the table 825. After it is determined over which lines of text the user is attempting to insert table 825, the method proceeds to decision step 715.

At decision step 715, it is determined whether the table 825 covers the complete width of at least one paragraph and more than one line of text. Referring to FIG. 8A, the table 825 does not cover the complete width of at least one paragraph and more than one line of text, so the user is probably not trying to draw the table 825 over the existing text. At step 720, the drawn table 825 is added to the electronic document 805 at the start of the paragraph containing the point of insertion 815 as a separate paragraph from the text and no text is inserted into the table. The end result displayed to the user is illustrated in FIG. 8B.

Another example demonstrating method 700 is illustrated in reference to FIGS. 9A and 9B. Referring now to FIG. 9A, a document 905 includes text with paragraph marks, such as a paragraph mark 930. A table tool 910 is provided and a new table 925 has been drawn beginning at an insertion point 915 and ending at an end point 920. As shown in FIG. 9A, the table 925 is represented by dashed lines to show that it has not been inserted into the document yet because the user has not released the mouse button. The document 905 also includes text lines 935, 940, 945, 950, and 955.

Referring now to FIGS. 7 and 9A, the method 700 for inserting a table over existing text begins at start step 705 and proceeds to step 710 when a user draws the table 925 and releases the mouse button to insert that table into the document 905. At step 710, it is determined that the user is attempting to insert a table over lines 935 and 940. After it is determined over which lines of text the user is attempting to insert a table, the method proceeds to decision step 715.

At decision step 715, it is determined whether the drawn table covers the complete width of at least one paragraph and more than one line of text. It is determined that the table 925 covers more than one line of text (lines 935 and 940) and covers the complete width of paragraph 930. Thus, for this example, the method proceeds to decision step 725. At decision step 725, it is determined that the table 925 covers the entire width of the paragraph 930, but does not cover all the lines because the line 945 of the paragraph 930 is not covered. Thus, the method proceeds to step 730.

At step 730, the paragraph 930, which includes the covered text, is split into separate paragraphs, 960 and 930, and the covered text is placed into table 925. Thus, as illustrated in FIG. 9B, lines 935 and 940 are placed into their own paragraph 960 and the line 945 is left as the only remaining line of the paragraph 930. The end result is shown in FIG. 9B.

A third example demonstrating method 700 is illustrated in reference to FIGS. 10A and 10B. Referring now to FIG. 10A, a document 1005 includes text with paragraph marks, such as a paragraph mark 1030. A table tool 1010 is provided and a new table 1025 has been drawn beginning at an insertion point 1015 and ending at an end point 1020. As shown in FIG. 10A, the table 1025 is represented by dashed lines to show that it has not been inserted into the document yet because the user has not released the mouse button. The document 1005 also includes text lines 1035, 1040, 1045, 1050, and 1055.

Referring now to FIGS. 7 and 10A, the method 700 for inserting a table over existing text begins at start step 705 and proceeds to step 710 when a user draws the table 1025 over existing text in the document 1005 using the table drawing tool 1010. At step 710, it is determined that the user is attempting to insert the table 1025 over lines 1035, 1040, 1045, and 1050. The method then proceeds to decision step 715.

At decision step 715, it is determined that table 1025 covers the complete width of the paragraph 1030 and more than one line of text, so the method proceeds to decision step 725. At decision step 725, it is determined that the table 1025 extends across the entire width of the paragraph 1030 and covers all the lines of the paragraph 1030, so the method proceeds to step 735.

At step 735, the complete paragraph 1030 is placed into the drawn table 1025. Also, the sentence 1050 is placed into its own paragraph 1060. All the covered text (lines 1035, 1040, 1045, and 1050) is placed into the drawn table. The result illustrated in FIG. 10B is displayed to the user.

Method for Converting a Bordered Paragraph Into a Table

Figure 11:
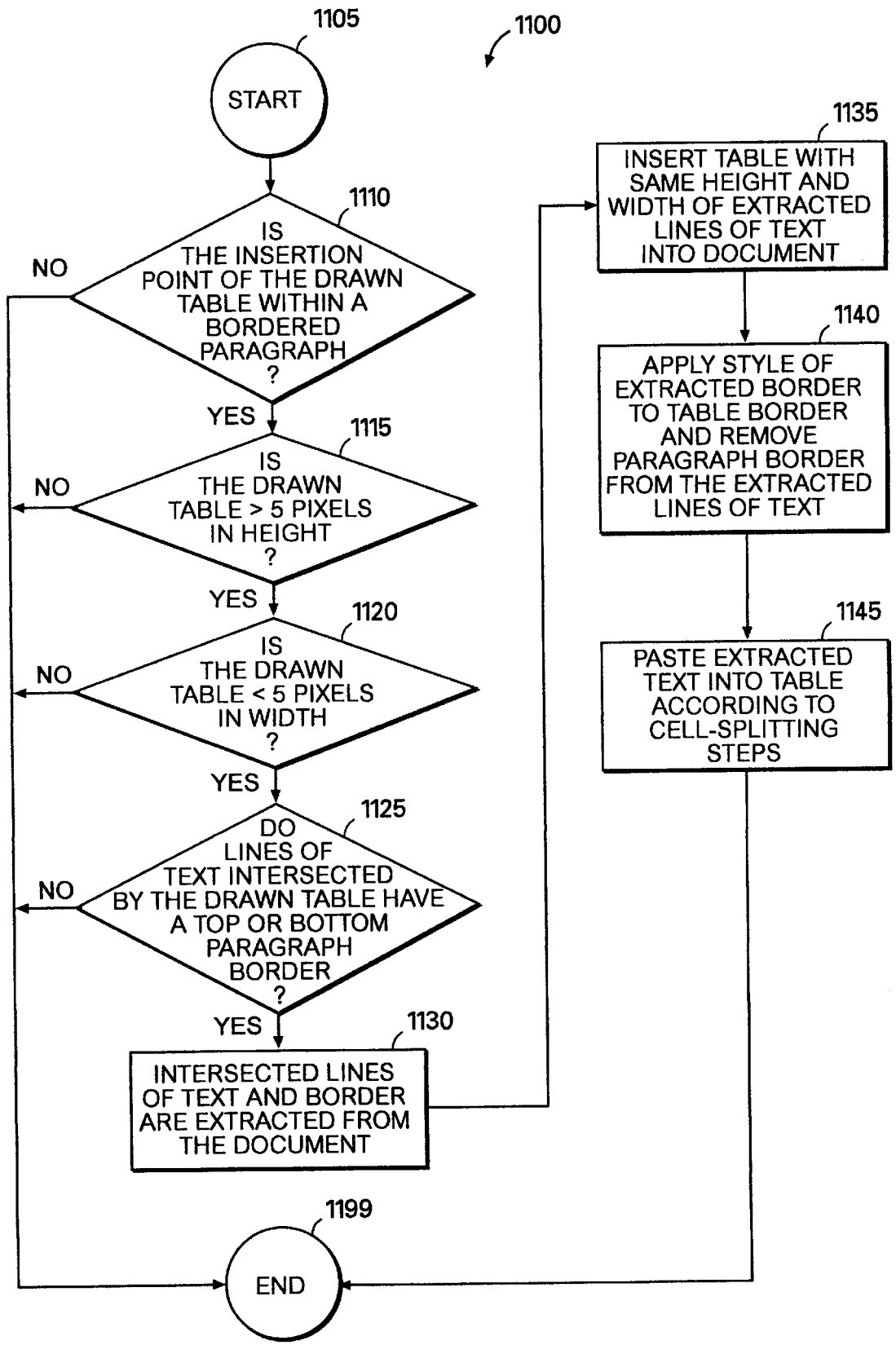
FIG. 11 is a flowchart illustrating a method for converting a bordered paragraph into a table.

Referring now to FIG. 11, the table tool also includes the capability to convert a bordered paragraph into a table. Sometimes, using prior art table tools, a user attempts to split a bordered paragraph using the table tool. A border is a type of formatting that may be applied to a paragraph to provide a pattern around the paragraph. In many cases, a border may appear to be a table to a user and, thus, the user may try to edit a bordered paragraph as if it were a table. However, in the prior art, the results were unsatisfactory because the bordered paragraph is not a table even though it may appear to be a table to the user. Generally described, method 1100 converts a bordered paragraph into a table so that it may be split according to certain table-splitting rules described below.

Referring now to FIG. 11, the method 1100 for converting a bordered paragraph into a table begins at start step 1105 and proceeds to step 1110 when the user attempts to draw a table within a bordered paragraph. At step 1110, it is determined whether the insertion point of the drawn table is within a bordered paragraph. If so, the method proceeds to decision step 1115. If not, then the method ends at step 1199.

At decision step 1115, it is determined whether the drawn table is greater than 5 pixels in height. If not, then the method ends at step 1199. If the drawn table is greater than 5 pixels in height, then the method proceeds to decision step 1120. It should be understood that height typically refers to the total length of the drag, independent of whether the drag if top-to-bottom or left-to-right.

At decision step 1120, it is determined whether the drawn table is less than five pixels in width. If so, then the user is probably not drawing a separate table, but instead is probably trying to split the bordered paragraph and, thus, the method proceeds to decision step 1125. However, if it is determined that the drawn table is greater than five pixels in width, then the user is probably trying to draw a separate table apart from the bordered paragraph and, thus, the method ends at step 1199.

It should be understood that decision steps 1115 and 1120 are described with regard to a vertical table drag used to split a bordered paragraph. For a horizontal table drag used to split a table, similar steps are used although different dimensions are used. For example, for a horizontal table drag used to split a table, then the width dimension would be used at decision step 1115 and the height dimension would be used at decision step 1120.

At decision step 1125, the lines of text intersected by the drawn table are examined and it is determined whether the intersected lines of text have a top or bottom paragraph border. If not, then the method ends at step 1199. However, if the lines of text intersected by the drawn table do have a top or bottom paragraph border, then the method proceeds to step 1130.

At step 1130, the intersected lines of text, including the paragraph border, are extracted from the document and the method proceeds to step 1135. A table with the same height and width of the extracted lines of text is inserted into the document at step 1135 and the method proceeds to step 1140.

At step 1140, the style of the extracted paragraph border is applied to the table border and the paragraph border is removed from the extracted text. The method then proceeds to step 1145. The extracted text is pasted into the table at step 1145 according to the cell-splitting steps described below. The cell-splitting steps are described in respect to FIGS. 19, 20A, 20B, 21, 22A and 22B. The method then ends at step 1199.

Figure 12A:
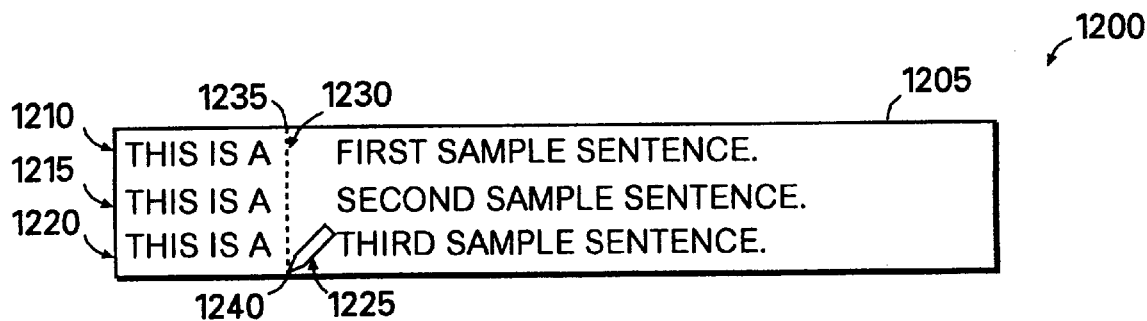
FIGS. 12A and 12B are illustrations of converting a bordered paragraph into a table.
Figure 12B:
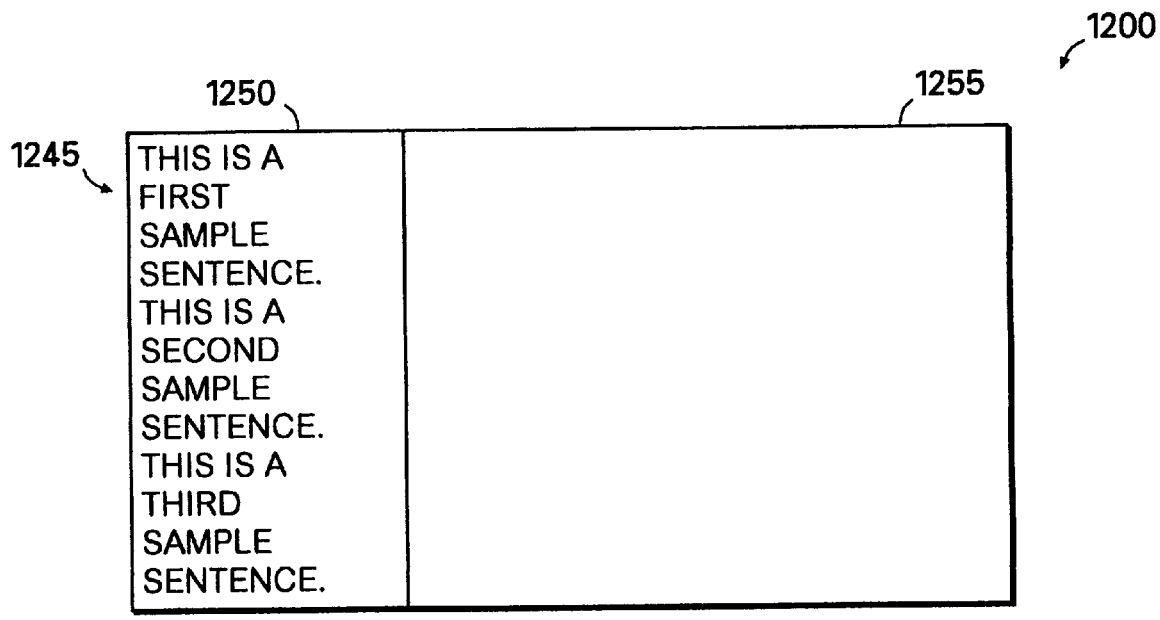

To demonstrate method 1100, an example is provided in reference to FIGS. 12A and 12B. Referring now to FIG. 12A, document 1200 includes text lines 1210, 1215, and 1220. A table tool 1225 is provided and new table 1230 has been drawn beginning at insertion point 1235 by depressing the mouse button and ending at end point 1240. As shown in FIG. 12A, table 1230 is represented by dashed lines to show that it has not been inserted into the document yet because the user has not released the mouse button.

Referring now to method 1100 and FIGS. 11 and 12A, the method 1100 for converting a bordered paragraph into a table begins at start step 1105 and proceeds to step 1110 when the user attempts to draw table 1230 within bordered paragraph 1205. At step 1110, it is determined that the insertion point 1235 of the table 1230 is within a bordered paragraph because the insertion point is on the bordered paragraph 1205. The method proceeds to decision step 1115.

At decision step 1115, it is determined that drawn table 1230 is greater than 5 pixels in height. At decision step 1120, it is determined that the table 1230 is less than five pixels in width. At decision step 1125, the lines of text 1210, 1215, and 1220 intersected by drawn table 1230 are examined and it is determined that the intersected lines of text (1210, 1215 and 1220) have a paragraph border (1205). At step 1130, the intersected lines of text, including the paragraph border, are extracted from the document and the method proceeds to step 1135. A table with the same height and width of the extracted lines of text is inserted into the document at step 1135 and the method proceeds to step 1140. At step 1140, the style of the extracted paragraph border is applied to the table border and the paragraph border is removed from the extracted text. The method then proceeds to step 1145. The extracted text is pasted into the table at step 1145 according to the cell-splitting steps described below. The cell-splitting steps are described in respect to FIGS. 19, 20A, 20B, 21, 22A and 22B. The method then ends at step 1199. The result displayed to the user is illustrated in FIG. 12B. The paragraph borders 1205 have been converted into a table 1245 with two cells 1250 and 1255.

Another situation concerning paragraph borders that sometimes occurs is that a user attempts to draw a table surrounding one or more paragraphs with paragraph borders. The user views the paragraph borders as cells in a table and expects them to be incorporated into a table as cells. With prior art table drawing tools, the results were unsatisfactory because typically the table was inserted at the insertion point and the paragraphs with paragraph borders were placed above or below the table and were not incorporated into the table. However, in an embodiment of the present invention, if a user draws a table that surrounds one or more paragraphs with paragraph borders using the table drawing tool in accordance with the present invention, then the method 1300 illustrated in FIG. 13 is performed.

Figure 13:
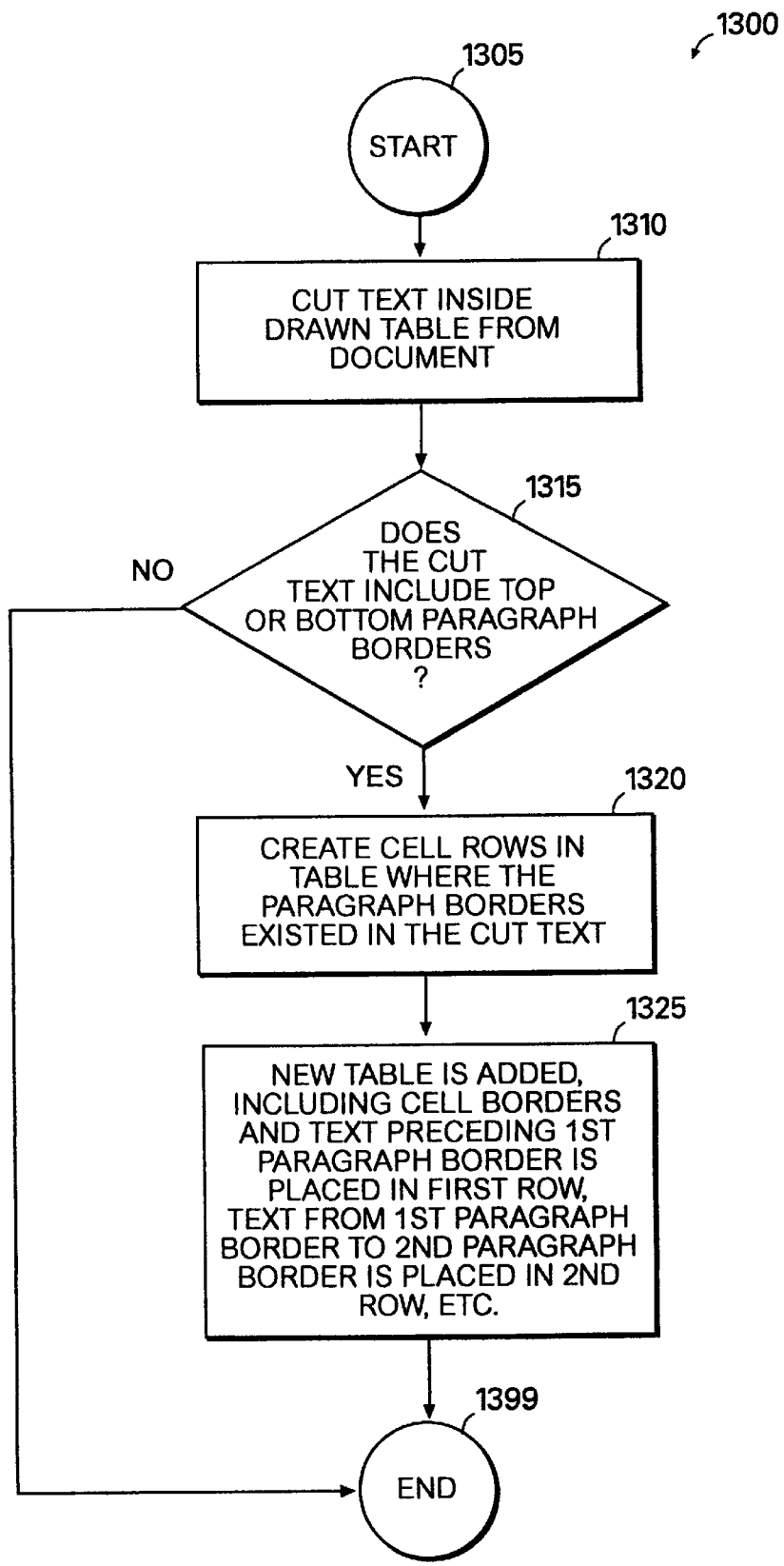
FIG. 13 is a flowchart illustrating a method for inserting a table surrounding one or more paragraphs with paragraph borders.

Referring now to FIG. 13, the method 1300 begins at start step 1305 and proceeds to step 1310 where the text inside the drawn table is cut from the document and the method proceeds to decision step 1315.

At decision step 1315, it is determined whether the cut text includes either top or bottom paragraph borders. If not, then the method ends at step 1399. However, if the cut text includes either top or bottom paragraph borders, then the method proceeds to step 1320. At step 1320, cell rows are created in the table where the paragraph borders existed in the cut text and the method proceeds to step 1325. It should be understood that at step 1320, a new table row is created at each point where there was a top or bottom paragraph border. This step may also be understood as a drawn table being split into rows a number of times equal to the number of top/bottom paragraph borders that the table was drawn over.

At step 1325, the new table is added to the document, including cell borders, and the lines of text preceding the first paragraph border are inserted as a paragraph into the first row of the new table, the lines of text from the first paragraph border to the second paragraph border are inserted as a paragraph into the second row, the lines of text from the second paragraph border to the third paragraph border are inserted as a paragraph into the third row, etc. In other words, the lines of text from the nth paragraph border to the (n+1)th paragraph border are inserted as a paragraph into the (n+1)th row of the new table. The method then ends at step 1399.

Figure 14A:
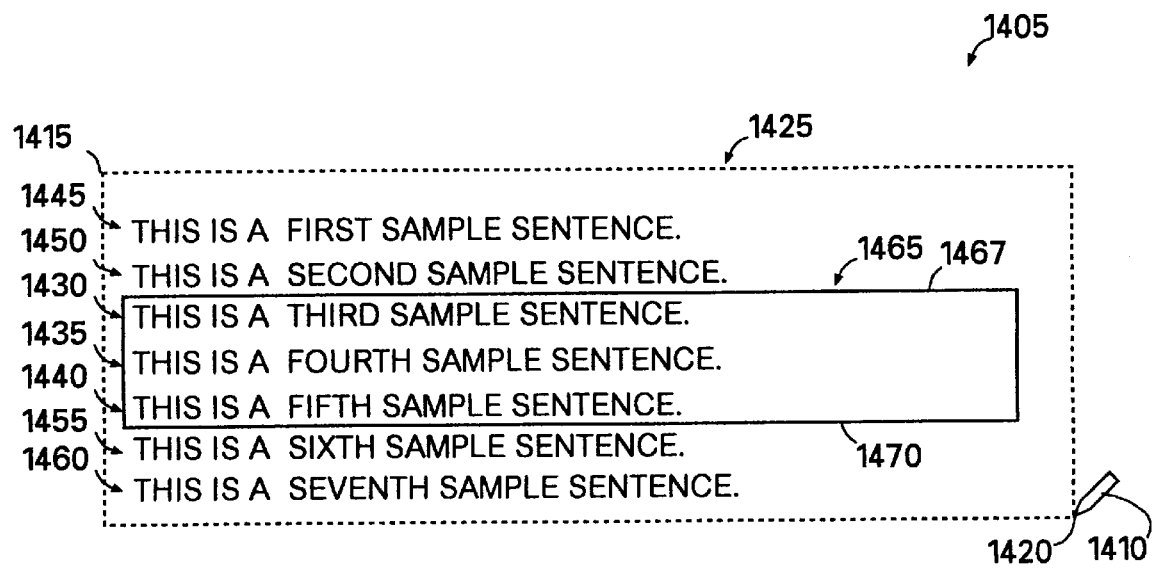
FIGS. 14A and 14B are illustrations of inserting a table surrounding one or more paragraphs with paragraph borders.
Figure 14B:
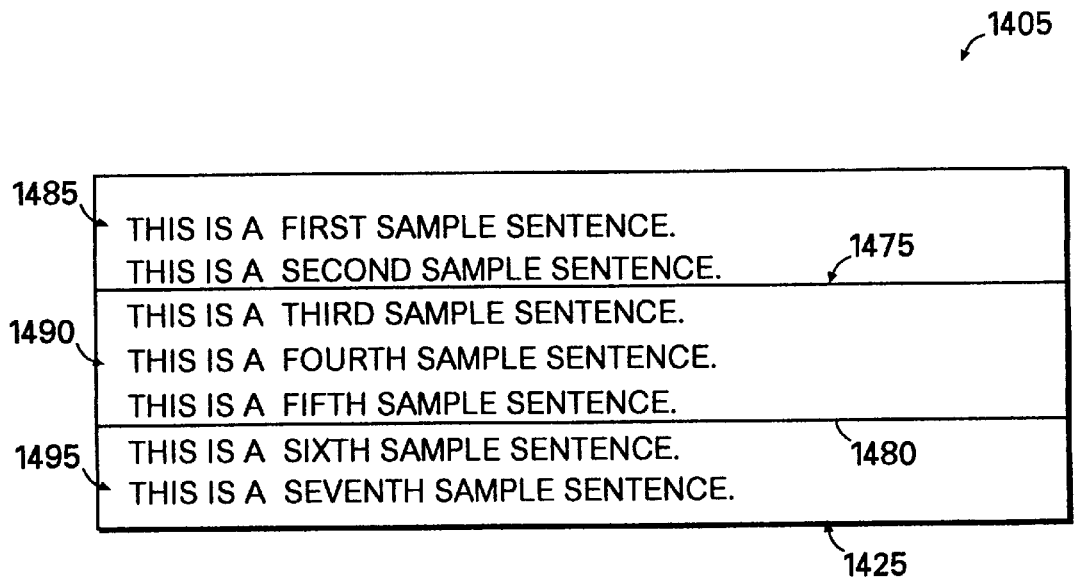

To demonstrate method 1300, an example is provided in reference to FIGS. 14A and 14B. Referring now to FIG. 14A, document 1405 includes text, including lines of text 1430, 1435, 1440, 1445, 1450, 1455, 1460 within paragraph border 1465. A table tool 1410 is provided and new table 1425 has been drawn beginning at insertion point 1415 by depressing the mouse button and dragging the mouse to end point 1420. As shown in FIG. 14A, table 1425 is represented by dashed lines to show that it has not been inserted into the document because the user has not released the mouse button.

Referring now to method 1300 and FIGS. 13 and 14A, the method 1300 for inserting a table over existing text begins at start step 1305 and proceeds to step 1310 where the text inside the drawn table (lines 1445, 1450, 1430, 1435, 1440, 1455, and 1460) is cut from document 1405 and the method proceeds to decision step 1315.

At decision step 1315, it is determined that the cut text includes a top paragraph border 1467 and a bottom paragraph border 1470 and the method proceeds to step 1320. Referring now to FIG. 14B, at step 1320, cell borders 1475 and 1480 are created in document 1405 where the paragraph borders existed in the cut text and the method proceeds to step 1325.

At step 1325, the new table 1425 is added to document 1405, including cell borders 1475 and 1480. The lines of text 1445 and 1450 preceding the first paragraph border 1465 are inserted into the first row 1485 of the table, the lines of text 1430, 1435, 1440 from the first paragraph border 1465 to the second paragraph border 1470 are placed in the second row 1490, the lines of text 1455, 1460 from the second paragraph border 1470 to the bottom of the table 1425 are placed in the third row 1495.

Method for Adding Cells to a Table

The table tool also includes the capability to add cells to an existing table in a document. Using prior art table tools, it was difficult to add cells to a table. Typically, using prior art table tools, a new table separated by a paragraph might be added to the document when the user actually wanted to add a cell to an existing table.

Figure 15:
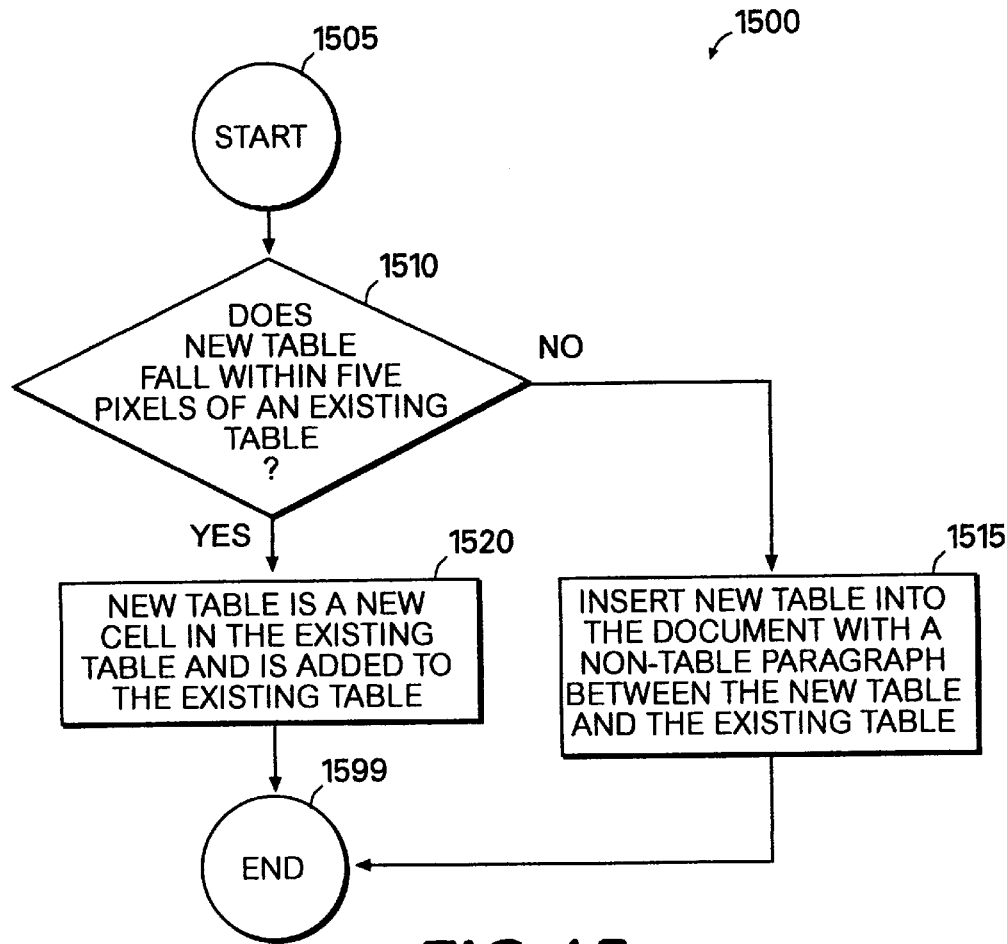
FIG. 15 is a flowchart illustrating a method for adding a cell to the top or bottom of an existing table.

Referring now to FIG. 15, a method 1500 for adding cells to the top or bottom of an existing table in accordance with an embodiment of the present invention is illustrated. The method 1500 begins at start step 1505 and proceeds to decision step 1510 when a user attempts to add a new table to a document. It is determined whether the new table falls within 5 pixels of the top or bottom of an existing table at decision step 1510. If so, then the method proceeds to step 1520. However, if it is determined that the new table is not within 5 pixels of the top or bottom of an existing table, then the method proceeds to step 1515.

At step 1515, the new table is inserted into the document with a non-table paragraph between the new table and any existing table. The method then ends at step 1599.

At step 1520, it is determined that the new table is a new cell in the existing table and, thus, is added as a new cell to the top or bottom of the existing table. The method then ends at step 1599.

It should be understood that a table is a collection of paragraphs with special formatting. To add a cell to a table, a new paragraph with formatting indicating it is part of a table, and having a height and width set according to the drawn table, is inserted into the document in the position immediately following (preceding) the last (first) cell of the table. This new paragraph is automatically considered part of the table by the word processing program module because there is no intervening "non-table" paragraph. In other words, all consecutive table paragraphs are considered part of the same table.

Figure 16A:
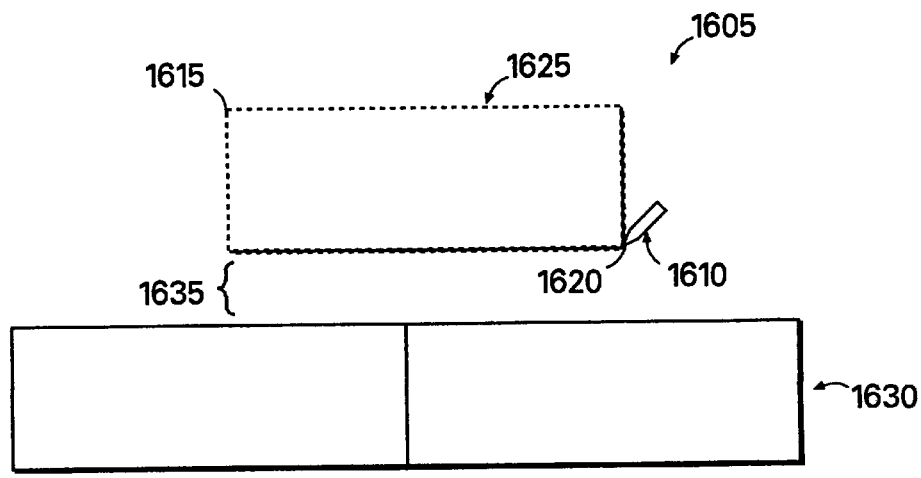
FIGS. 16A and 16B are illustrations of adding a cell to the top of an existing table.
Figure 16B:
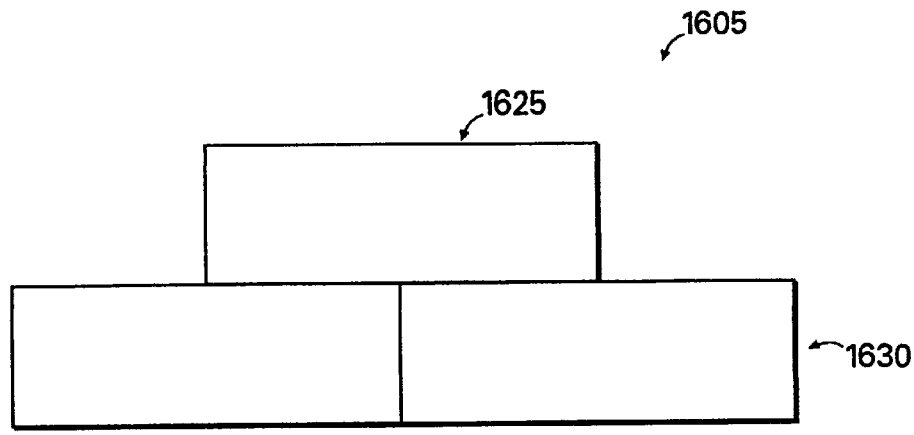

To demonstrate method 1500, an example is provided in reference to FIGS. 16A and 16B. Referring now to FIG. 16A, document 1605 is illustrated. A table tool 1610 is provided and new table 1625 has been drawn beginning at insertion point 1615 and ending at end point 1620. As shown in FIG. 16A, table 1625 is represented by dashed lines to show that it has not been inserted into the document because the user has not released the mouse button.

Referring now to FIG. 15 and FIG. 16A, method 1500 begins at start step 1505 and proceeds to decision step 1510 when a user attempts to add new table 1625 to document 1605. It is determined whether table 1625 falls within 5 pixels of the top or bottom of existing table 1630 at decision step 1510. If so, then the method proceeds to step 1520. However, if it is determined that the new table is not within 5 pixels of the top or bottom of existing table 1630, then the method proceeds to step 1515. Referring to FIG. 16A, distance 1635 is less than 5 pixels so the method proceeds to step 1520.

At step 1520, it is determined that table 1625 is a new cell in the existing table and, thus, is added as a new cell to the top or bottom of the existing table. The method then ends at step 1599 with the result illustrated in FIG. 16B displayed to the user.

Figure 17:
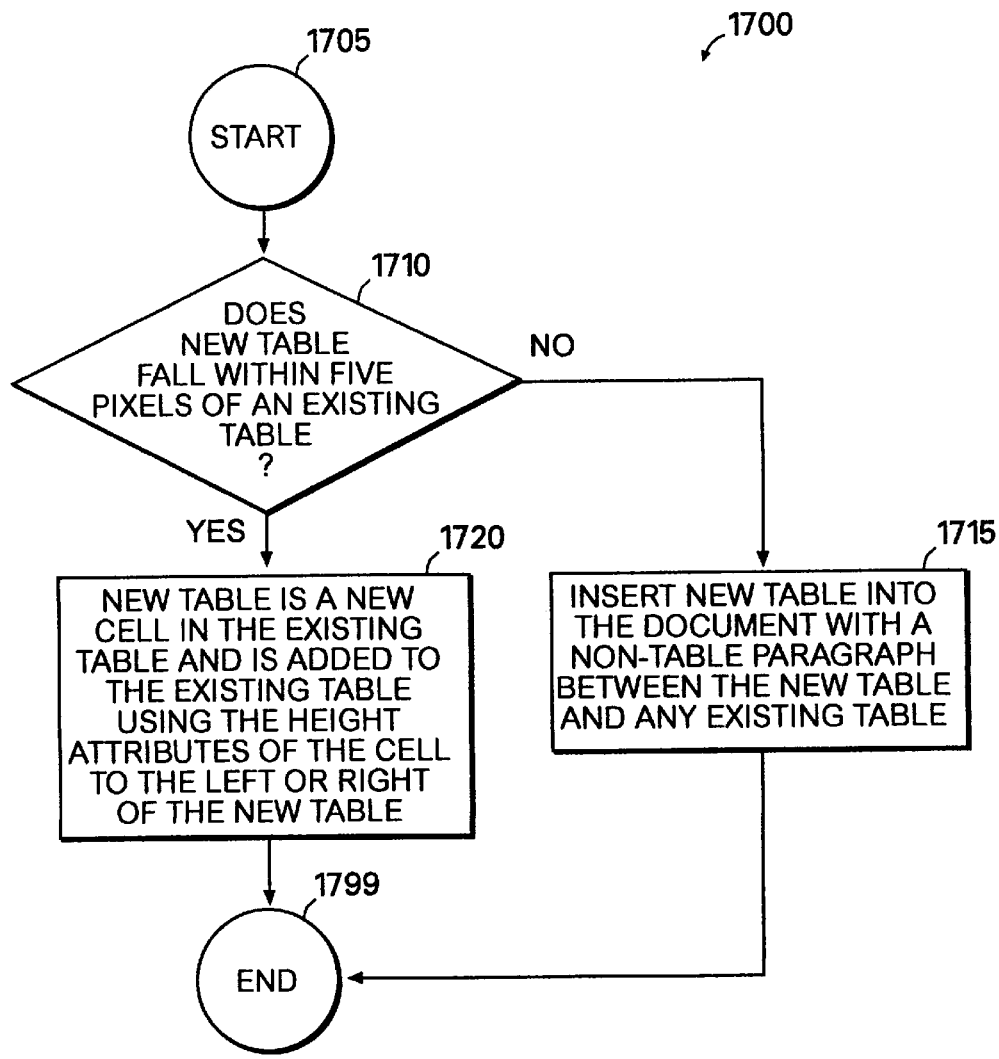
FIG. 17 is a flowchart illustrating a method for adding cells to the sides of an existing table.

Referring now to FIG. 17, a method 1700 for adding cells to the sides of an existing table in accordance with an embodiment of the present invention is illustrated. At step 1705 the method 1700 begins and proceeds to decision step 1710 when a user attempts to add a new table to a document. It is determined whether the new table falls within five pixels of an existing table at decision step 1710. If not, then the method proceeds to step 1715. If so, then the method proceeds to step 1720.

It should be understood that in an alternative embodiment, the method begins by determining whether the starting point of the drag is within the vertical distance covered by the table, or within 5 pixels vertical distance of the top or bottom of the table. For example, the new cell may be drawn 100 pixels to the right of an existing table, but if the start of the drag is at the same latitude as the table, then the new cell is considered to be part of the table and added as a cell.

At step 1715, the new table is inserted into the document with a non-table paragraph between the new table and any existing table with the result that the drawn table appears entirely above or below the existing table. The method then ends at step 1799.

At step 1720, it is determined that the new table is a new cell in the existing table and, thus, is added as a new cell in the existing table using the height attributes of the cell to the left of the cell (if the cell is added to the right side of the existing table) or to the right of the new cell (if the new cell is added to the left side of the existing table). It should be noted that when adding a cell to the side to an existing table that the top and bottom of the new cell snaps to the height of the nearest row. The method then ends at step 1799.

Figure 18A:
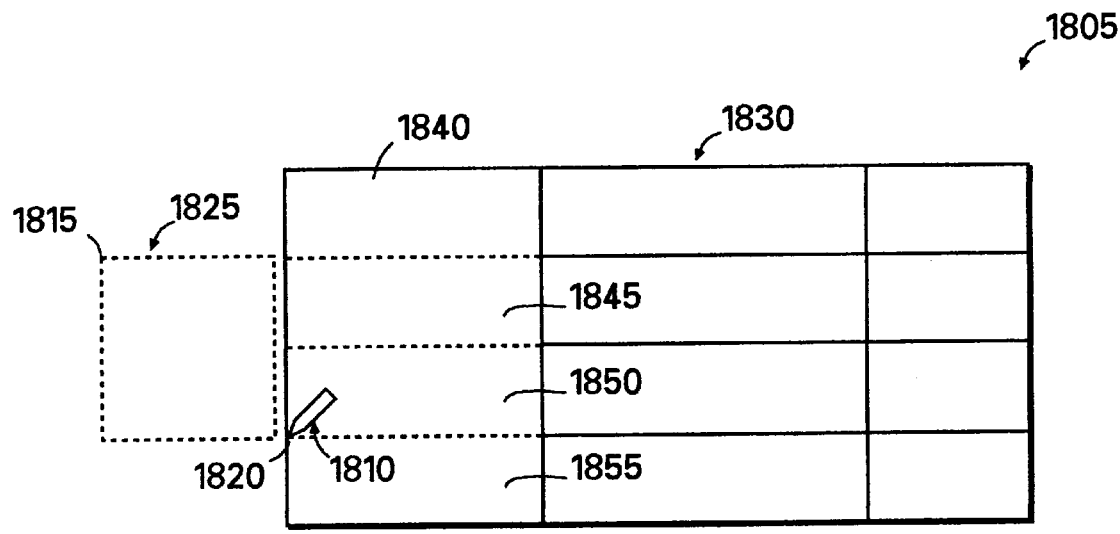
FIGS. 18A and 18B are illustrations of adding a cell to the side of an existing table.

To demonstrate method 1700, an example is provided in reference to FIGS. 17 and 18A. Referring now to FIG. 18A, document 1805 is illustrated. A table tool 1810 is provided and new table 1825 has been drawn beginning at insertion point 1815 and ending at end point 1820. As shown in FIG. 18A, table 1825 is represented by dashed lines to show that it has not been inserted into the document because the user has not released the mouse button.

Referring now to FIG. 17 and FIG. 18A, method 1700 begins and proceeds to decision step 1710 when a user attempts to add new table 1825 to document 1805. It is determined whether the insertion point 1815 of the new table falls within five pixels of the top or bottom of an existing table 1830, or anywhere in the vertical axis of the existing table irrespective of the horizontal distance between insertion point 1815 and the edges of table 1830 at decision step 1710. If not, then the method proceeds to step 1715. If so, then the method proceeds to step 1720. Referring to FIG. 18A, assume that insertion point 1815 is in the same vertical range covered by table 1830 or within five pixels of the top or bottom borders of table 1830.

Figure 18B:
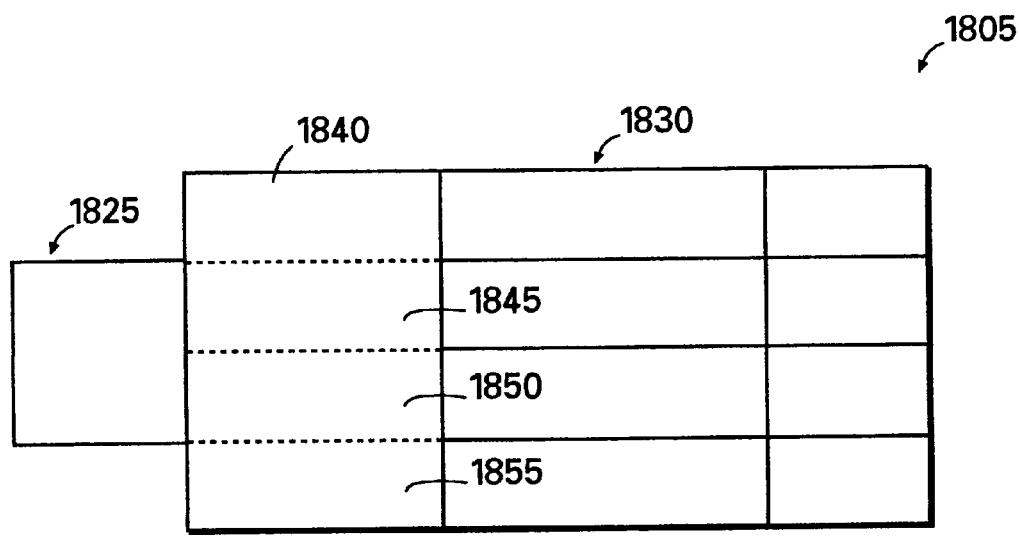

At step 1720, it is determined that the new table 1825 is a new cell in the existing table 1830 and, thus, is added as a new cell in the existing table using the height attributes of the cell to the right of the new cell (because the new cell is added to the left side of the existing table 1830). It should be noted that when adding a cell to the side to an existing table that the top and bottom of the new cell snaps to the height of the nearest row. For example, referring to FIG. 18B, the result displayed to the user is illustrated. Table 1830 includes master cell 1840 and slave cells 1845, 1850 and 1855. Master cells and slave cells are described above in the background. Referring to FIG. 18A, it will be noted that the top of cell 1825 is slightly above the height of the nearest row (the row with cell 1845) and that the bottom of cell 1825 is slightly above the height of the nearest row (the row with cell 1850). However, referring now to FIG. 18B, it will be noted that when the cell 1825 is added to the table, the top and bottom of cell 1825 has been aligned with the nearest row. The method then ends at step 1799.

Method for Splitting Cells that Include Text

The table tool also includes a feature for splitting cells in a table when the cells include text. If the split is attempted with a horizontal line, then the method 1900 for splitting cells with a horizontal line when the cells include text is performed as illustrated in FIG. 19.

Figure 19:
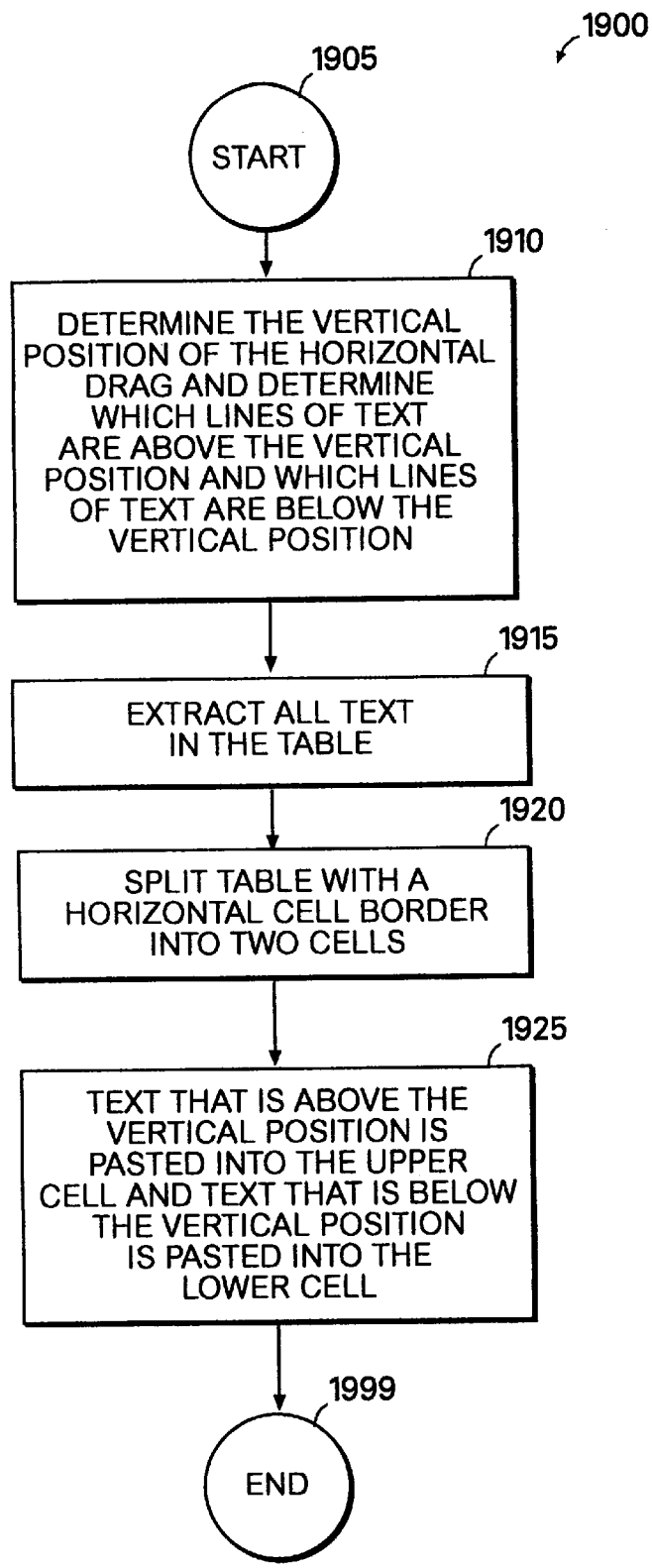
FIG. 19 is a flowchart illustrating a method for splitting cells in a table with a horizontal line when the cells include text.

Referring now to FIG. 19, at step 1905, the method 1900 begins and proceeds to step 1910 when a user attempts to split a cell(s), including text, with a horizontal line, or horizontal drag. The vertical position of the horizontal drag is determined and the lines of text in the table which are above and below the vertical position are determined at step 1910. Typically, text lines that are partially below the vertical position are determined to be above the vertical position. The method then proceeds to step 1915.

At step 1915, the text in the table is extracted and the method proceeds to step 1920. The table is split with a horizontal cell border into two cells at step 1920 and the method proceeds to step 1925. At step 1925, the lines of text that are above the vertical position are pasted into the upper cell and the lines of text that are below the vertical position are pasted into the lower cell. The method then ends at step 1999.

Figure 20A:
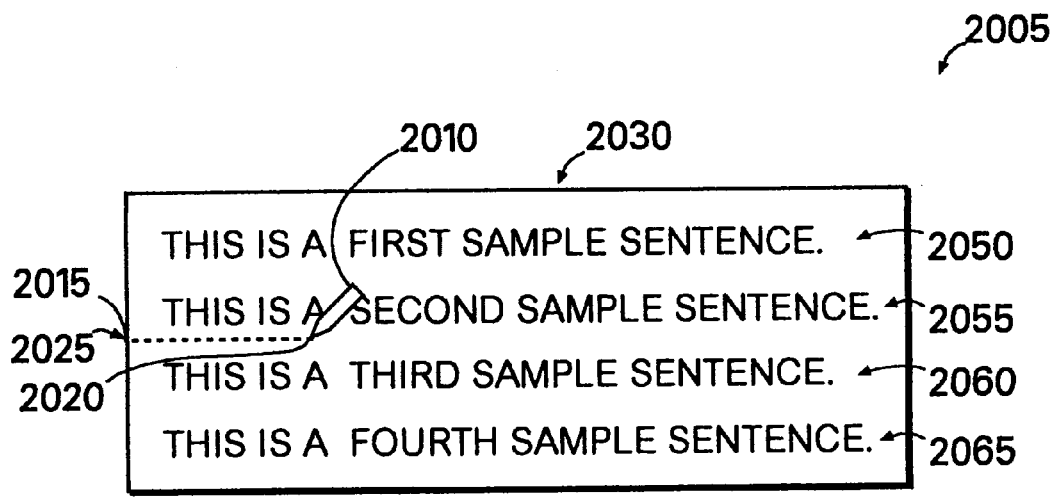
FIGS. 20A and 20B are illustrations of splitting cells in a table with a horizontal line when the cells include text.
Figure 20B:
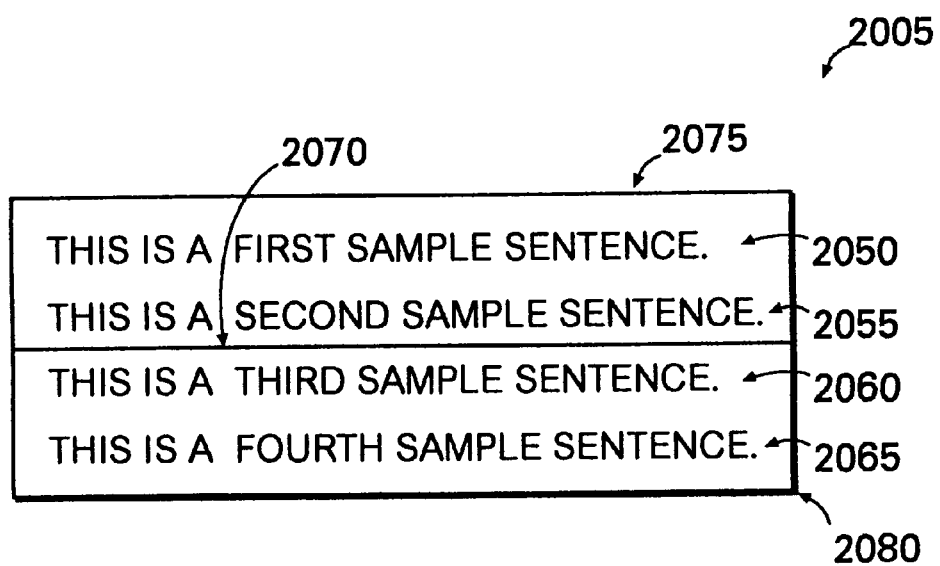

To demonstrate method 1900, an example is provided in reference to FIGS. 20A and 20B. Referring now to FIG. 20A, document 2005 includes text lines 2050, 2055, 2060 and 2065. A table tool 2010 is provided and horizontal drag 2025 has been drawn beginning at insertion point 2015 and ending at end point 2020. As shown in FIG. 20A, horizontal drag 2025 is represented by dashed lines to show that it has not been inserted into the document because the user has not released the mouse button.

Referring now to FIG. 19 and FIG. 20A, the method 1900 begins and proceeds to step 1910 when a user attempts to split a cell(s), i.e., table 2030, with horizontal drag 2025. The vertical position of the horizontal drag 2025 is determined and the lines of text in the table which are above and below the vertical position are determined at step 1910. Lines 2050, 2055 are determined to be above the vertical position and lines 2060, 2065 are determined to be below the vertical position. The method then proceeds to step 1915.

At step 1915, text lines 2050, 2055, 2060, 2065 in the table 2030 are extracted and the method proceeds to step 1920. The table 2030 is split with a horizontal cell border 2070 into two cells 2075, 2080 at step 1920 and the method proceeds to step 1925. At step 1925, the lines of text 2050, 2055 above the vertical position are pasted into the upper cell 2075 and the lines of text 2060, 2065 that are below the vertical position are pasted into the lower cell 2080. The method then ends at step 1999.

Figure 21:
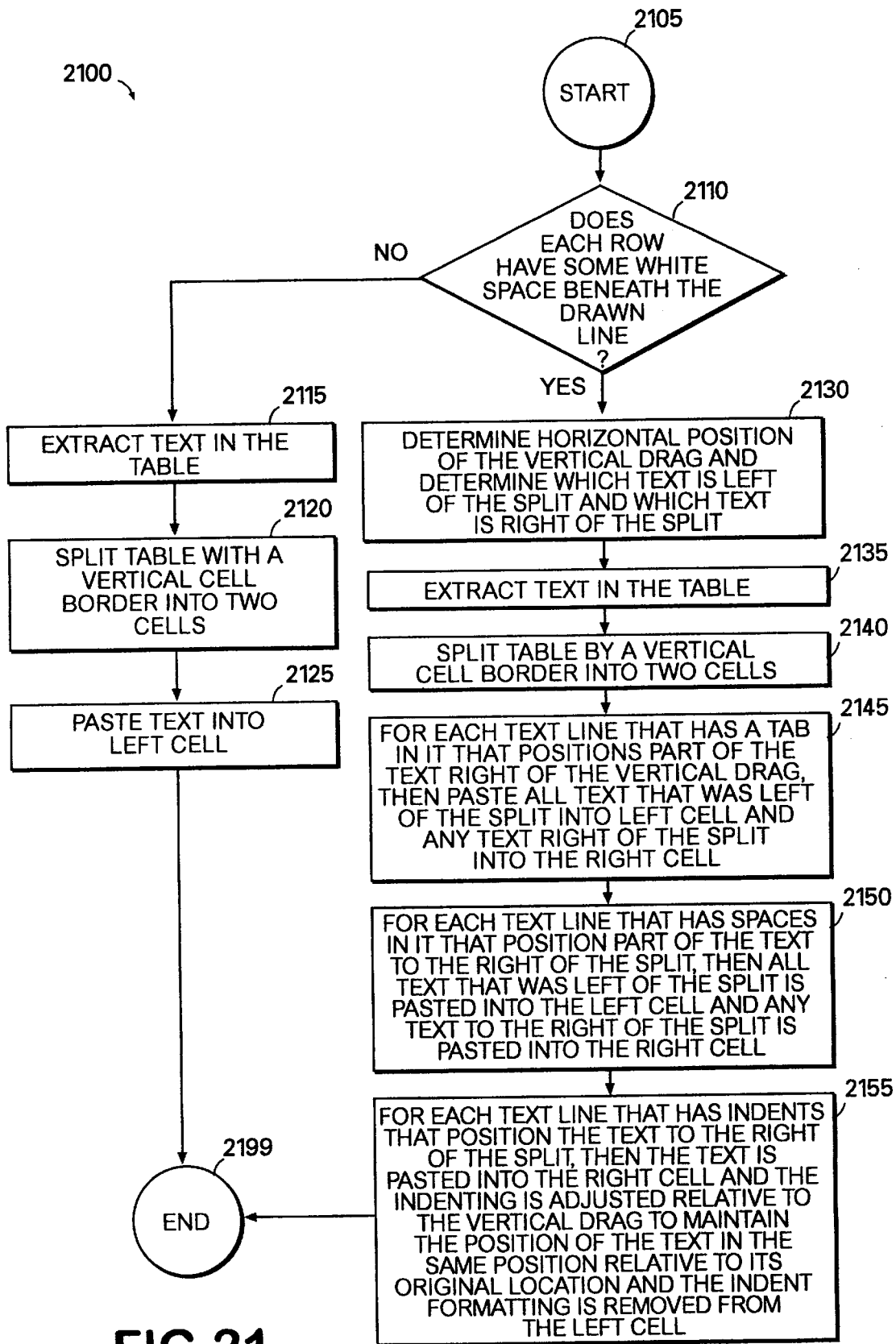
FIG. 21 is a flowchart illustrating a method for splitting cells in a table with a vertical line when the cells include text.

If a split of a cell is attempted with a vertical line, then the method 2100 for splitting a cell/table, including text, with a vertical line, or drag is performed as illustrated in FIG. 21. Referring now to FIG. 21, at step 2105 the method 2100 begins and proceeds to decision step 2110. At decision step 2110, it is determined whether each row in the cell/table has some sort of white space underneath the drawn line. Typically, white space includes tabs, an indent, or two or more spaces. If not, then the method proceeds to step 2115. If so, then the method proceeds to step 2130.

At step 2115, the text in the cell/table is extracted and the method proceeds to step 2120. At step 2120, the cell/table is split into two cells, i.e., a left cell and a right cell, with a vertical cell border and the method proceeds to step 2125. The text is pasted into the left cell at step 2125 and the method ends at step 2199.

At step 2130, the horizontal position of the vertical drag is determined and it is determined which text is left of the horizontal position and which text is right of the horizontal position. At step 2135, the text in the table is extracted and the method proceeds to step 2140.

At step 2140, the table is split into two cells (a left cell and a right cell) by a vertical cell border and the method proceeds to step 2145. At step 2145, for each line that has a tab in it that positions part of the text to the right of the vertical drag, then all text that was left of the split is pasted into the left cell and any text to the right of the split is pasted into the right cell. It should be noted that the tab stop is repositioned to keep the text in the same position relative to its original location or removed if the text abuts the cell edge. The method then proceeds to step 2150.

At step 2150, for each line that has spaces in it that positions part of the text to the right of the split, then all text that was left of the split is pasted into the left cell, with trailing spaces removed, and any text to the right of the split is pasted into the right cell. It should be noted that leading spaces are removed and indents are applied to the paragraphs in the right cell relative to the vertical line to maintain position of the text in the same position relative to its original location. The method then proceeds to step 2155.

At step 2155 for each line that has indents in it that positions the text to the right of the split, then the text is pasted into the right cell and the indenting is adjusted relative to the vertical line to maintain the position of the text in the same position relative to its original location and the indent formatting is removed from the left cell. The method then ends at step 2199.

Figure 22A:
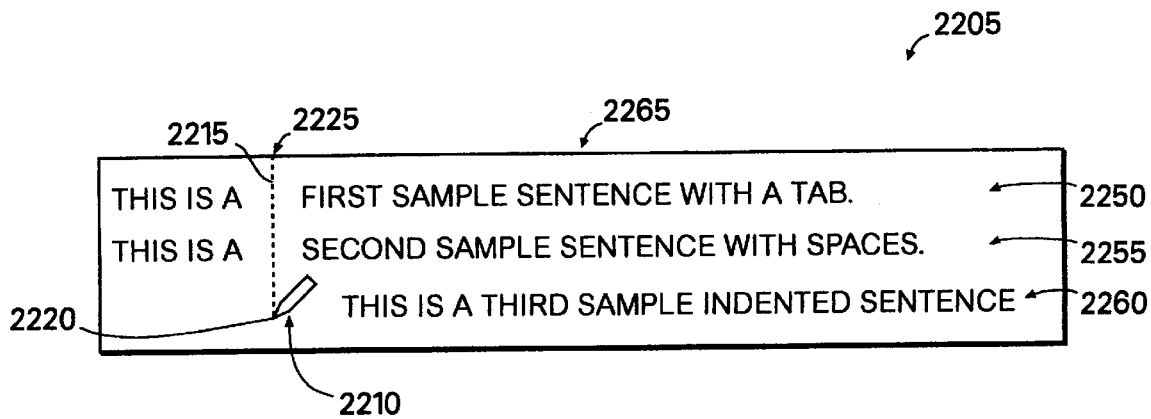
FIGS. 22A and 22B are illustrations of splitting cells in a table with a vertical line when the cells include text.
Figure 22B:
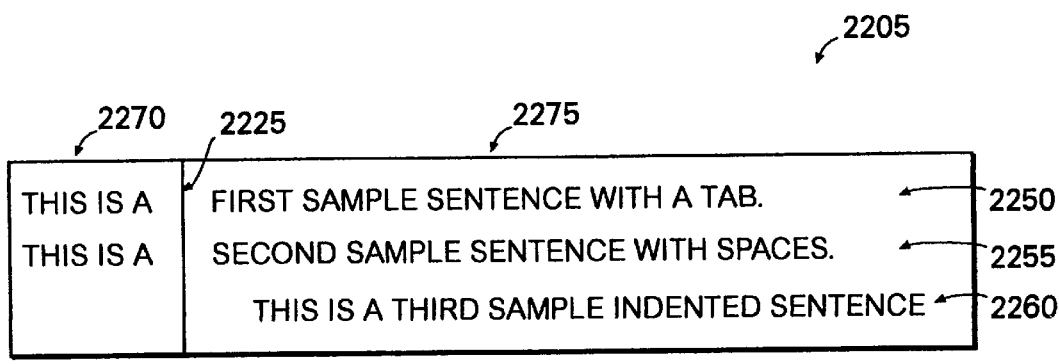

To demonstrate method 2100, an example is provided in reference to FIGS. 22A and 22B. Referring now to FIG. 22A, document 2205 includes text lines 2250, 2255, and 2260. A table tool 2210 is provided and vertical drag 2225 has been drawn beginning at insertion point 2215 and ending at end point 2220. As shown in FIG. 22A, vertical drag 2225 is represented by dashed lines to show that it has not been inserted into the document because the user has not released the mouse button.

Referring now to FIG. 21 and FIG. 22A, the method 2100 begins and proceeds to decision step 2110. At decision step 2110, it is determined that each row (text lines 2250, 2255, 2260) in table 2265 has some sort of white space beneath the drawn line, or vertical drag. For example, text line 2250 has a tab beneath vertical drag 2225, text line 2255 has two or more spaces beneath the vertical drag 2225, and text line 2260 has an indentation beneath the vertical drag 2225. The method then proceeds to step 2130.

At step 2130, the horizontal position of the vertical drag 2225 is determined and it is determined which text is left of the horizontal position and which text is right of the horizontal position. At step 2135, the text lines 2250, 2255, 2260 in the table 2265 is extracted and the method proceeds to step 2140.

At step 2140, the table 2265 is split into two cells (a left cell 2270 and a right cell 2275) by a vertical cell border 2225 and the method proceeds to step 2145. At step 2145, for text line 2250 that has a tab in it that positions part of the text to the right of the vertical drag, then all text that was left of the split is pasted into the left cell 2270 and any text to the right of the split is pasted into the right cell 2275. It should be noted that the tab stop is repositioned to keep the text in the same position relative to its original location or removed if the text abuts the cell edge. The method then proceeds to step 2150.

At step 2150, for text line 2255 that has spaces in it that positions part of the text to the right of the split, then all text that was left of the split is pasted into the left cell 2270, with trailing spaces removed, and any text to the right of the split is pasted into the right cell 2275. It should be noted that leading spaces are removed and indents are applied to the paragraphs in the right cell relative to the vertical line to maintain position of the text in the same position relative to its original location. The method then proceeds to step 2155.

At step 2155 for text line 2260 that has indents in it that positions the text to the right of the split, then the text is pasted into the right cell 2275 and the indenting is adjusted relative to the vertical cell border 2225 to maintain the position of the text in the same position relative to its original location and the indent formatting is removed from the left cell 2270. The method then ends at step 2199.

It should be understood that the text in a row is split if there is more than one space in a row, or if there is a tab or indent. However, in an alternative embodiment, the text in a cell may be split when there is only one space in a row.

From the foregoing description, it will be apparent to those skilled in the art that the present invention provides a method and system for inserting a table over text, for splitting a cell with text into two or more cells, for converting a bordered paragraph into a table, and for adding cells to a table.

Although the present invention has been described above as implemented in the preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. For an electronic system for creating and editing an electronic file including a plurality of existing lines of text, a method for inserting a table over the plurality of existing lines text in the electronic file, the method comprising the steps of:

receiving a user command to draw the table over the plurality of lines of text using a drawing tool;

determining a subset of the plurality of lines of text that the table covers;

determining whether the width of the table covers the width of the subset of the plurality of lines;

if the determination is made that the width of the table covers the width of the subset of text, performing the steps of;

extracting the subset of text from the electronic file and placing the subset into a paragraph;

deleting the extracted subset of text from the electronic file;

inserting the table into the electronic file with a height equal to a height of the extracted subset of text; and pasting the paragraph into the table;

if the determination is made that the width of the table does not cover the width of the subset of text, inserting the table to the electronic file as a paragraph that does not include the plurality of lines of text.

2. For an electronic system for creating and editing an electronic file including a plurality of lines of text, a method for converting a paragraph contained within a paragraph border, the paragraph border having an associated style, into a table, the method comprising the steps of:

receiving a user command to draw the table over the plurality of lines of text in the bordered paragraph;

determining whether the table is greater than a predetermined number of pixels in height;

in response to determining that the table is greater than the predetermined number of pixels in height, determining whether the table is less than a predetermined number of pixels in width;

in response to determining that the table is less than a predetermined number of pixels in width, determining whether at least one line of the text covered by the table shares a paragraph border;

extracting the subset of text, including the paragraph border, from the electronic file;

inserting the table into the bordered paragraph in the electronic file, wherein the table has the same height and width as the extracted subset of text;

applying the style associated with the extracted border to a style associated with the table; and pasting the subset of text inside the table.

3. The method recited in claim 2 further comprising the step of determining whether an insertion point of the table is within the bordered paragraph, before the step of determining whether the table is greater than the predetermined number of pixels in height.

4. The method recited in claim 3 wherein the first table has the same height and width as the subset of text.

5. For an electronic system for creating and editing an electronic file including a plurality of paragraphs, wherein at least one paragraph is contained within a paragraph border, the paragraph border having an associated style, into a table, the method comprising the steps of:

receiving a user command to draw the table over a subset of the plurality of paragraphs using a table drawing tool;

extracting from the electronic file the subset of paragraphs inside a table boundary formed by the table drawing tool;

determining whether the subset of paragraphs includes either a top or a bottom paragraph border;

if the determination is made that the subset of paragraphs includes either a top or bottom paragraph border, performing a sequence comprising the steps of;

adding the table to the electronic file, wherein the table has a height equal to a height of the extracted subset of paragraphs, creating a cell border having an associated style in the table at the location of the top paragraph border and bottom paragraph border, wherein the style associated with the cell border is the same style associated with the paragraph border inserting a subset of the plurality of lines of text preceding the top paragraph border into a first row of the table, inserting a subset of the plurality of lines of text between the top paragraph border and the bottom paragraph border into a second row of the table, and inserting a subset of the plurality of lines of text following the bottom paragraph border into a third row of the table, and if the determination is made that the subset of paragraphs do not include either a top or bottom paragraph border, not converting the paragraph into a table.

6. The method of claim 1, wherein the step of determining whether the width of the table covers the width of the subset of lines of text, comprises the steps of:

determining whether the width of the table covers the width of at least one paragraph containing the subset of lines of text;

if the determination is made that the width of the table covers the width of at least one paragraph, determining whether the table covers all the lines of the subset of text in the paragraph;

if the determination is made that the table does not cover all the lines of the subset of text in the paragraph, performing the sequence of;

splitting the paragraph covered by the table into a first paragraph and second a paragraph, extracting the subset of text covered by the table and placing the subset of text into the first paragraph, extracting the text not covered the table and placing the text into the second paragraph, deleting the paragraph from the electronic file, inserting the table into the electronic file and pasting the first paragraph into the table, and pasting the second paragraph into the electronic file outside the table.

\* \* \* \* \*